US011474911B2

(12) United States Patent
Takazawa

(10) Patent No.: US 11,474,911 B2
(45) Date of Patent: Oct. 18, 2022

(54) INFORMATION PROCESSING APPARATUS, CONTROL METHOD THEREOF, AND STORAGE MEDIUM

(71) Applicant: Canon Kabushiki Kaisha, Tokyo (JP)

(72) Inventor: Satoshi Takazawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/341,772

(22) Filed: Jun. 8, 2021

(65) Prior Publication Data

US 2021/0382793 A1 Dec. 9, 2021

(30) Foreign Application Priority Data

Jun. 9, 2020 (JP) .............................. JP2020-100275

(51) Int. Cl.
*G06F 11/00* (2006.01)
*G06F 11/14* (2006.01)
*G06F 11/32* (2006.01)
*G06F 11/07* (2006.01)

(52) U.S. Cl.
CPC ...... *G06F 11/1464* (2013.01); *G06F 11/0772* (2013.01); *G06F 11/1451* (2013.01); *G06F 11/1469* (2013.01); *G06F 11/324* (2013.01); *G06F 11/327* (2013.01)

(58) Field of Classification Search
CPC ............ G06F 11/0772; G06F 11/1451; G06F 11/1464; G06F 11/1469; G06F 11/324; G06F 11/327
See application file for complete search history.

(56) References Cited

U.S. PATENT DOCUMENTS

| 2005/0208803 | A1* | 9/2005 | Rohatgi | G06F 21/6236 439/159 |
| 2013/0173556 | A1* | 7/2013 | Grigg | H04L 67/04 707/667 |
| 2014/0006355 | A1* | 1/2014 | Kirihata | G06F 9/45533 707/654 |
| 2018/0349075 | A1* | 12/2018 | Inoue | H04L 41/0846 |
| 2021/0103498 | A1* | 4/2021 | Yoshimura | G06F 11/1451 |
| 2021/0109694 | A1* | 4/2021 | Matsumura | G06F 3/1229 |

FOREIGN PATENT DOCUMENTS

JP 2011173305 A 9/2011

* cited by examiner

*Primary Examiner* — Marc Duncan
(74) *Attorney, Agent, or Firm* — Venable LLP

(57) ABSTRACT

An information processing apparatus manages backup data that can be used as installation data and receives a request from an external apparatus. Also, the present information processing apparatus, in a case where the received request is a request for acquiring backup data, generates, by using the backup data, the installation data to be provided based on information associated with the request origin and information associated with the acquisition origin of the backup data. Wherein the installation data is generated by deleting, as necessary, information to be concealed in the managed backup data.

16 Claims, 12 Drawing Sheets

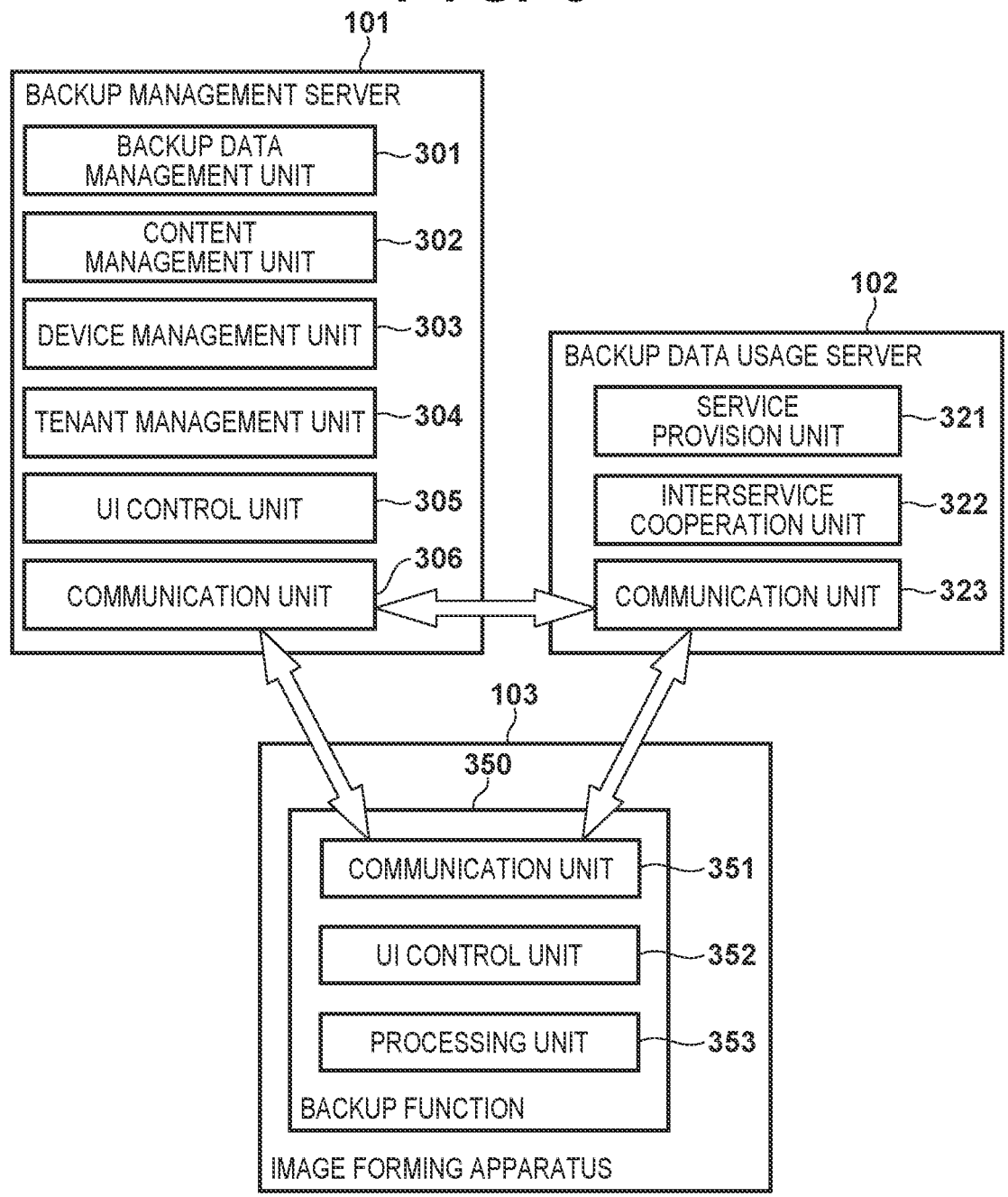

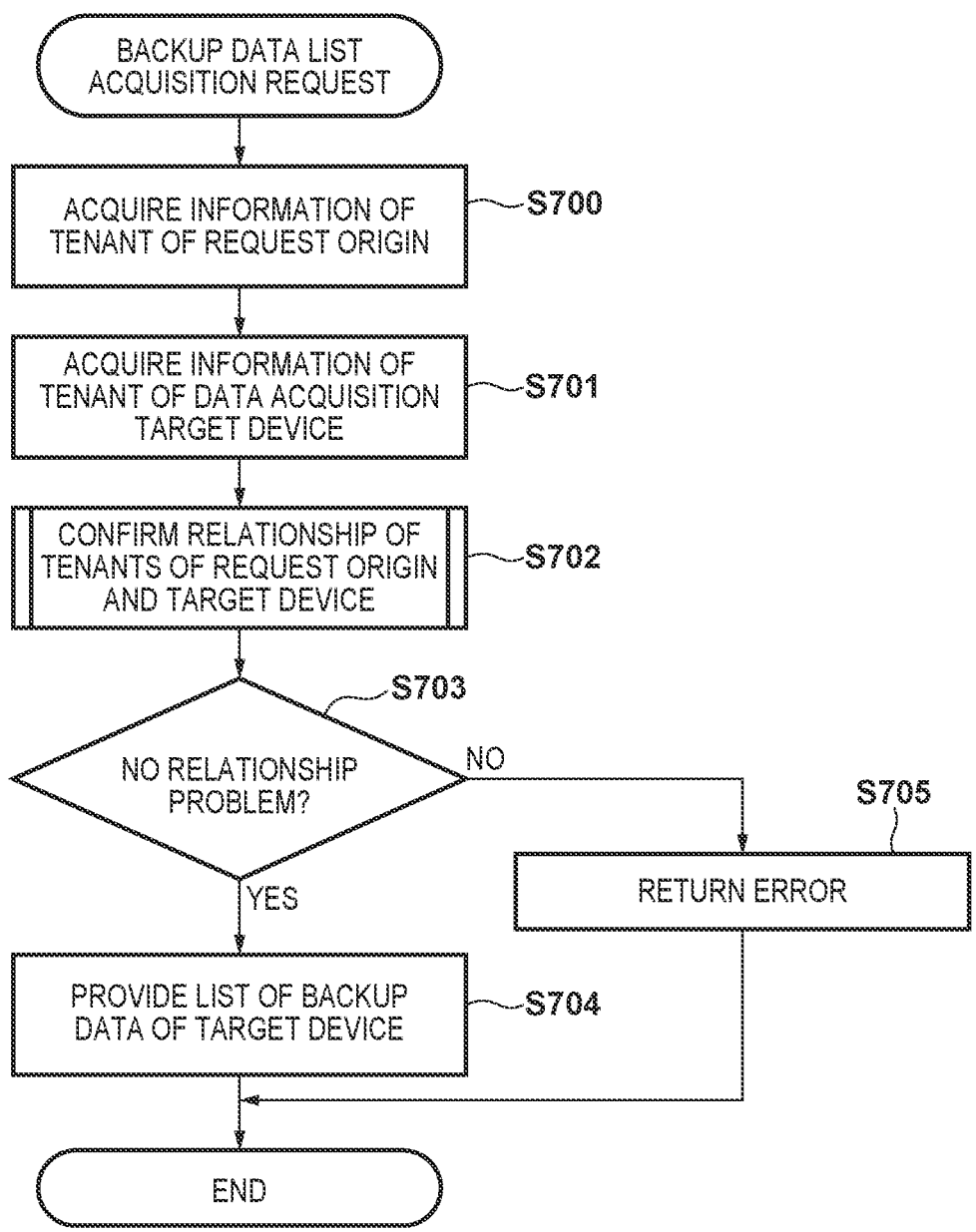

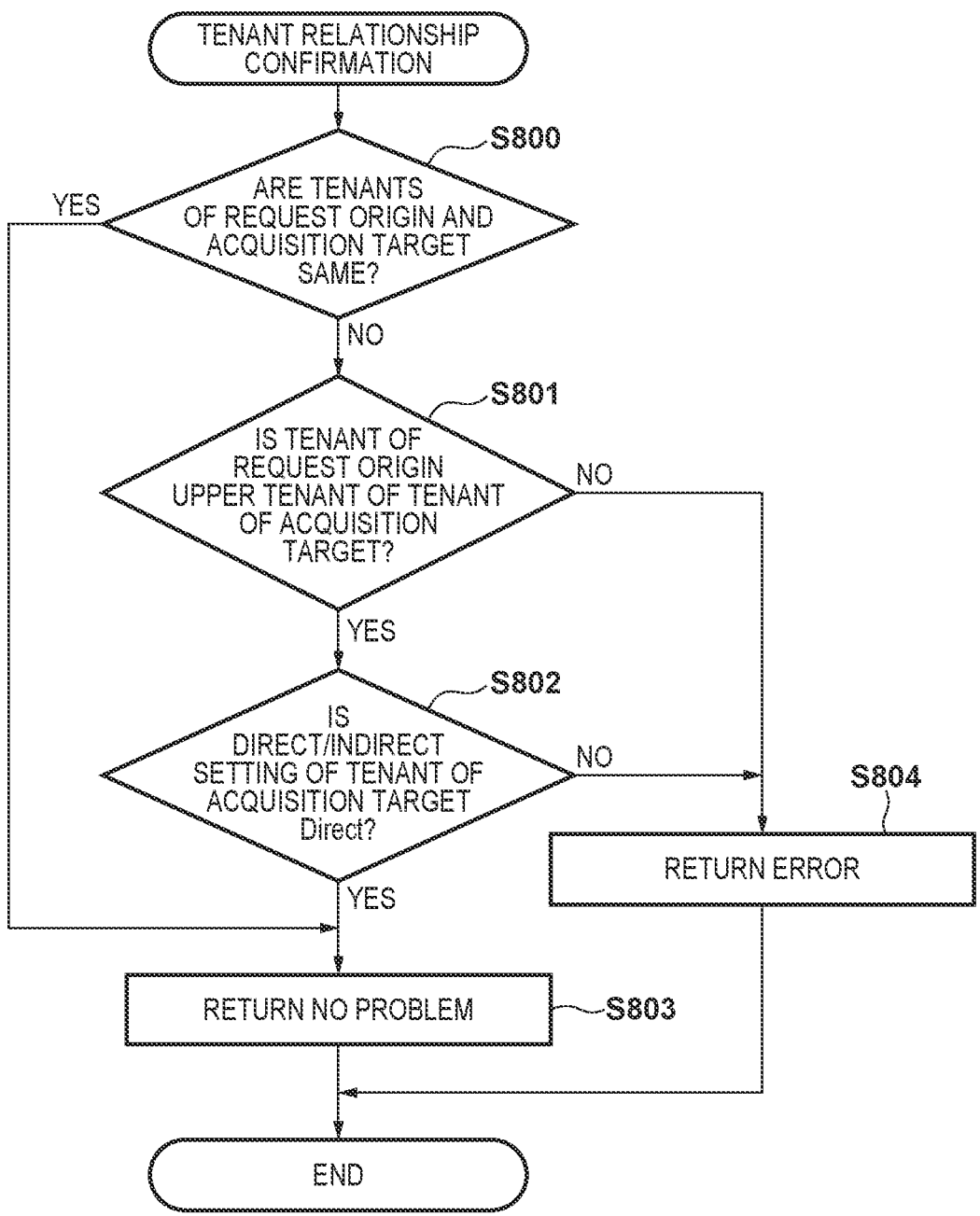

INFORMATION PROCESSING APPARATUS, CONTROL METHOD THEREOF, AND STORAGE MEDIUM

BACKGROUND

Field

The present disclosure relates to an information processing apparatus, a control method thereof, and a storage medium.

Description of the Related Art

It has become common for information processing apparatuses such as image forming apparatuses to regularly acquire backup data in order to restore setting values being used at a time of malfunction in preparation for a case where there is malfunction of a hard disk included in the apparatus or the like. This backup data is stored in a cloud service server or a server within an intranet and is provided to a request origin in accordance with a request from a client application that exists within the information processing apparatus or the like.

Meanwhile, in introducing an information processing apparatus to a customer's environment, initial installation operations in which application installation and setting value change are performed in accordance with the customer's usage environment are conducted. In these initial installation operations, there also are cases where an initial installation system in which processing from generation of data and setting values to be applied by an edit tool or the like to application of the generated data is semi-automated is used.

In the initial installation operations, there also are cases where setting values are inherited by a new information processing apparatus, which is an operation target, using the aforementioned backup data of an old currently-used information processing apparatus. Also, generating general-purpose data for settings based on the aforementioned backup data makes it possible to deploy in relation to other information processing apparatuses settings that are closer to onsite operations.

For example. Japanese Patent Laid-Open No. 2011-173305 proposes a technique for deploying backup data in relation to other information processing apparatuses. Specifically, it proposes a method in which, at a time of setting inheritance between apparatuses, backup data is not reflected as initial values for setting values that cannot be used in a device on which the settings are to be applied and the backup data is converted into similar values and then reflected.

However, the conventional technology described above has problems described below. For example, in the conventional technology described above, in a case where the general-purpose data for initial installation operations (i.e., data to be applied to another information processing apparatus) is considered, backup data content is retained as is; accordingly, confidential information that includes personal information such as an address book is also included. Also, in the conventional technology described above, even in a case where the confidential information is deleted in backup data conversion processing, if the technology is not applied to general-purpose data usage, the confidential information will be applied and reflected. In other words, there is a high possibility of confidential data that includes personal information being leaked.

SUMMARY

The present disclosure enables realization of a mechanism for suitably controlling, in accordance with a request origin, provision of confidential information that is included in backup data when providing the backup data to be used in setting an apparatus.

One aspect of the present disclosure provides an information processing apparatus comprising: at least one memory device that stores a set of instructions; and at least one processor that executes the set of instructions to: manage backup data acquired from a first apparatus, wherein the managed backup data can be used for generating installation data; receive a request from a request origin; in a case where the received request is a first request for acquiring the managed backup data, generate, by using the managed backup data, installation data to be provided based on information associated with the request origin and information associated with the first apparatus, wherein the installation data is generated by deleting, as necessary, information to be concealed in the managed backup data; and provide the generated installation data to the request origin.

Another aspect of the present disclosure provides a method for controlling an information processing apparatus, the method comprising: managing backup data acquired from a first apparatus, wherein the managed backup data that can be used for generating installation data; receiving a request from a request origin; in a case where the received request is a first request for acquiring the managed backup data, using the managed backup data to generate the installation data to be provided based on information associated with the request origin and information associated with the first apparatus, wherein the installation data is generated by deleting, as necessary, information to be concealed in the managed backup data; and; providing the generated installation data to the request origin.

Still another aspect of the present disclosure provides a non-transitory storage medium operable to store a program for causing a computer to execute each step of a method for controlling an information processing apparatus, the method comprising: managing backup data acquired from a first apparatus, wherein the managed backup data can be used for generating installation data; receiving a request from a request origin; in a case where the received request is a first request for acquiring the managed backup data, using the managed backup data to generate the installation data to be provided based on information associated with the request origin and information associated with the first apparatus, wherein the installation data is generated by deleting, as necessary, information to be concealed in the managed backup data; and providing the generated installation data to the request origin.

Further features of the present disclosure will be apparent from the following description of exemplary embodiments with reference to the attached drawings.

BRIEF DESCRIPTION OF THE DRAWINGS

FIG. 3 is a view illustrating an example of a software configuration of the backup system according to the embodiment.

FIG. 7 is a view illustrating a processing flow for acquiring a list of backup data according to the embodiment.

FIG. 8 is a view illustrating a processing flow for confirming a tenant relationship according to the embodiment.

DESCRIPTION OF THE EMBODIMENTS

Figure 1:
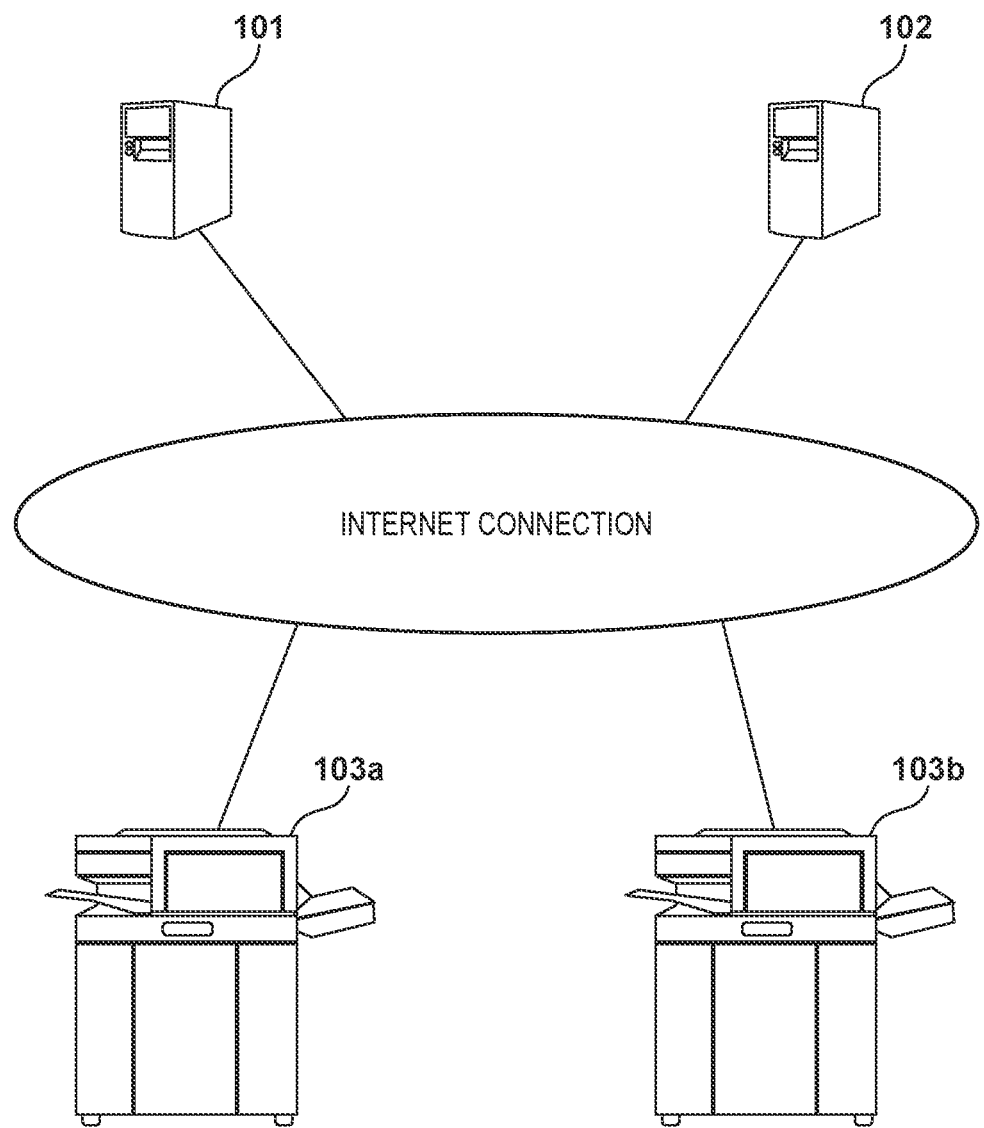
FIG. 1 is a view illustrating an example of a device configuration of a backup system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

<System Configuration>

A first embodiment of the present disclosure will be described below. First, an example of a device configuration of a backup system according to the present embodiment will be described with reference to FIG. 1. The backup system of the present disclosure is configured to include a management server 101 (hereinafter referred to as management server) that provides services on the Internet and a backup data usage server 102 (hereinafter referred to as usage server) that acquires and uses backup data. Also, this backup system is configured to include an image forming apparatus 103a which is an acquisition origin of the backup data and an image forming apparatus 103b which is a destination that uses the backup data by an instruction from the usage server 102. Here, the backup data is something that includes various kinds of information such as setting information that an apparatus of acquisition origin is using and stored information such as an address book and image information and may be any kind of information so long as it is information that is wished to be inherited by a new apparatus when, for example, the apparatus has malfunctioned. Accordingly, the backup data is preferably, regularly updated. Note that the present disclosure is not intended to be limited to the types or number of these apparatuses and may be configured to include other servers and/or apparatuses. In the following, assume that matters that apply to both the image forming apparatuses 103a and 103b are being described in a case where the image forming apparatus 103 is simply referred to and a or b is not appended to the reference numeral.

The management server 101 is a server for managing data such as backed-up setting values that may be regularly transmitted from the image forming apparatus 103. The management server 101 functions as an acceptance unit and, once a backup start request is received from the image forming apparatus 103, issues a URI (Uniform Resource Identifier) of a data upload destination and notifies the image forming apparatus 103. The backup start request is a request from the image forming apparatus 103 of request origin to upload data such as setting values in relation to the management server 101. Also, the management server 101 manages the backup data that was uploaded in relation to the issued URI. Also, the management server 101, upon receiving a restoration request from the image forming apparatus 103 in a case where the image forming apparatus 103 has malfunctioned or the like, notifies a URI for acquiring the backup data of a target device. The restoration request is a request from the image forming apparatus 103 of request origin to acquire backup data uploaded to the management server 101. Furthermore, in relation to a backup data acquisition request from an external system such as the usage server 102, a backup file is duplicated in accordance with a request origin and conditions and is provided to the request origin. The backup data acquisition request is a request for acquiring backup data that accords with a request origin from the backup data managed in the management server 101.

The usage server 102 is a server that requests for the backup data managed in the management server 101. The usage server 102 realizes, for example, an initial installation system for generating data for initial installation for when newly installing an image forming apparatus. There are cases where backup data, which is operation data, is used as a base in the initial installation system when generating general-purpose installation data to be applied to a plurality of image forming apparatuses. At this time, the usage server 102 requests the management server 101 for necessary backup data. Note that the usage server 102 is not limited to the initial installation system and need only be an apparatus that uses backup data. In other words, the usage server 102 need only be a device that has a configuration that can acquire the backup data managed in the management server 101 via communication with the management server 101 and a configuration that can provide an image forming apparatus with the generated general-purpose setting data.

The image forming apparatus 103 is, for example, a multifunction peripheral (multifunction printer) that provides in a copying machine a plurality of functions such as a scanner, a printer, a facsimile, and a file transmission function. Note that the image forming apparatus is not intended to be limited to a multifunction printer, and the present disclosure can be applied to single function printers. The image forming apparatus 103a is an apparatus that regularly uploads its own backup data in relation to the management server 101. Here in the present embodiment. "regularly" is something that includes, for example, temporally regular timings such as once a day but may also include timings at which setting change, firmware version update, or the like are performed and change from the latest backup data has been made. For example, "regularly" may also include a case where there is an update from the backup data at a timing when a consumable has been replaced, a timing when an option apparatus or the like has been connected in relation to the image forming apparatus 103a, and the like. In a case where a hard disk of the image forming apparatus 103 has malfunctioned, settings are wished to be returned to that of a certain point in time, or the like, the image forming apparatus 103 or an alternative apparatus such as a PC that an operator uses can transmit a request for restoring setting values of the image forming apparatus 103 in relation to the management server 101. By this, the settings of the image forming apparatus 103 can be returned to the settings of a certain point in time. The image forming apparatus 103b is a target apparatus on which installation data generated in the usage server 102 (e.g., the initial installation system) is applied. Alternatively, the image forming apparatus 103b may request for backup data of inheritance origin in relation to the management server 101 and apply that to itself. The backup data of inheritance origin indicates data that, for example, a predetermined image forming apparatus has uploaded in relation to the management server 101. Accordingly, the image forming apparatus 103b needs to transmit to the management server 101, together with the request, information that identifies the aforementioned predetermined image forming apparatus in addition to identification information that indicates itself.

<Hardware Configuration of Backup System>

Figure 2:
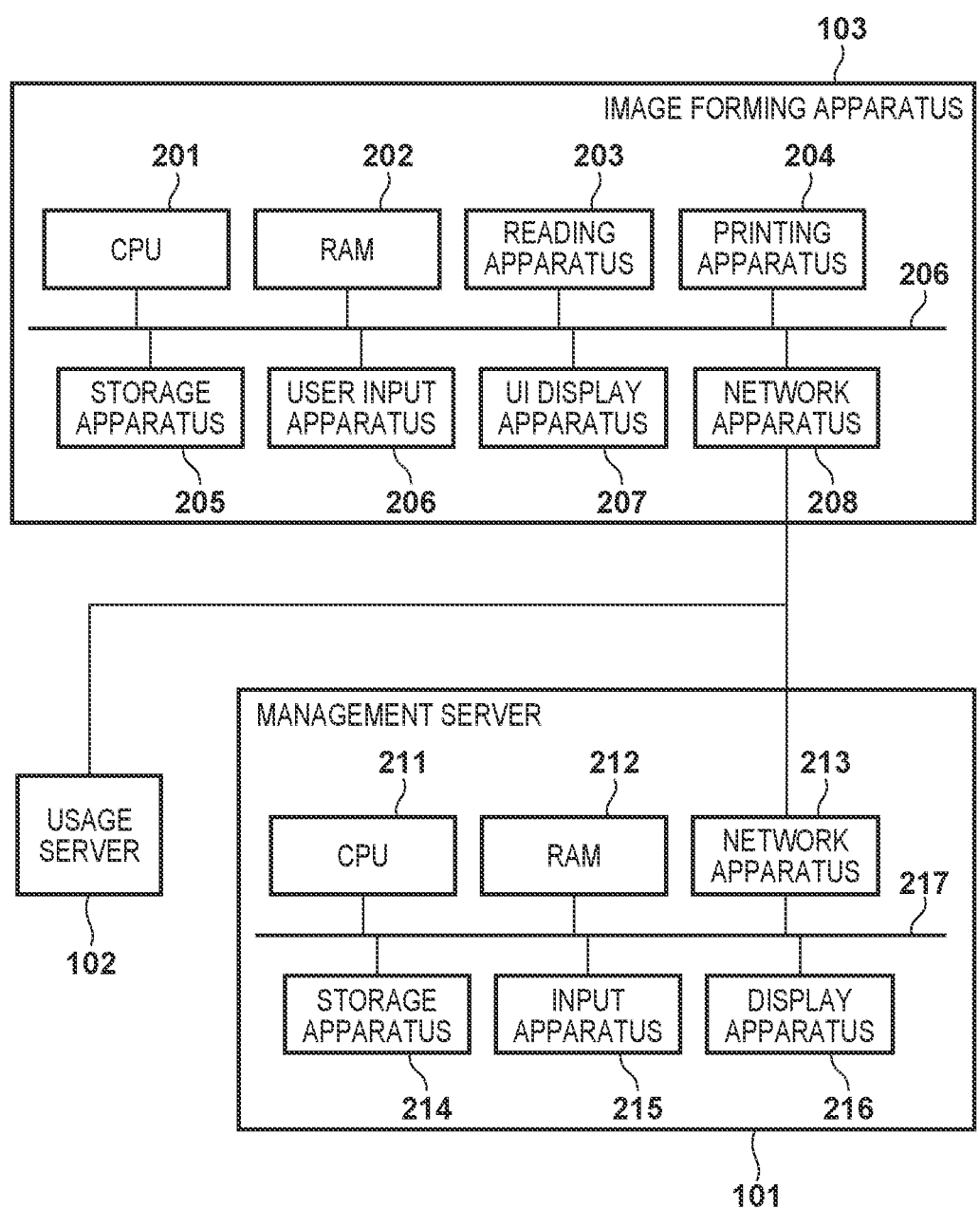
FIG. 2 is a view illustrating an example of a hardware configuration of the backup system according to the embodiment.

Next, an example of a hardware configuration of each of the apparatuses included in the backup system according to the present embodiment will be described with reference to FIG. 2. The image forming apparatus 103 comprises a CPU 201, a RAM 202, a reading apparatus 203, a printing apparatus 204, a storage apparatus 205, a user input apparatus 206, a UI display apparatus 207, and a network apparatus 208 as a hardware configuration. The CPU 201 realizes control that is characteristic of the present disclosure in addition to control of the entire image forming apparatus 103. The RAM 202 is a memory for providing a work area of the CPU 201. The reading apparatus 203 reads images from documents such as a sheet. The printing apparatus 204 prints images onto a sheet or the like. The storage apparatus 205 stores programs and various setting values and may be an HDD, an NVRAM, or the like. The user input apparatus 206 is an apparatus on which a user performs input of commands. The UI display apparatus 207 performs display of screens such as an operation screen and a result screen. The network apparatus 208 is something that performs communication with an external device by a network and any communication mode, such as wireless or wired, and communication protocol may be used. Each of the components are connected so as to be able to mutually transmit and receive signals by a main bus 200. Note that in the present embodiment, regarding the image forming apparatus 103, the CPU 201 controls the respective apparatuses via the main bus 200 unless otherwise specified. Also, the UI display apparatus 207 may be configured to include the user input apparatus 206 such as a touch panel display. Accordingly, the user input apparatus 206 may include software buttons realized by a touch panel display in addition to hardware buttons.

Next, a hardware configuration of the management server 101 will be described. Note that a configuration of the usage server 102 can be realized by the same configuration as the management server 101; accordingly, detailed description will be omitted. The management server 101 comprises a CPU 211, a RAM 212, a network apparatus 213, a storage apparatus 214, an input apparatus 215, and a display apparatus 216 as a hardware configuration. The CPU 211 realizes control that is characteristic of the present disclosure in addition to control of the entire management server 101. The RAM 212 is a memory for providing a work area of the CPU 211. The storage apparatus 214 stores programs and various kinds of usage information and may be an HDD, an NVRAM, or the like. The input apparatus 215 is an apparatus on which a user performs input of commands. The display apparatus 216 performs display of screens such as an operation screen and a result screen. The network apparatus 213 is something that performs communication with an external device by a network and any communication mode, such as wireless or wired, and communication protocol may be used. Each of the components is connected so as to be able to mutually transmit and receive signals by a main bus 210.

<Software Configuration of Entire System>

Next, an example of a software configuration of the backup system according to the present embodiment will be described with reference to FIG. 3. This backup system is configured to include the management server 101, the backup data usage server 102 and the image forming apparatus 103. Each of the functional units illustrated in FIG. 3 indicates a software configuration realized by the CPU that each of the management server 101, the usage server 102, and the image forming apparatus 103 (103a, 103b) has executing a control program.

The management server 101 is a management server that manages data backed up from the image forming apparatus 103 and has a backup data management unit 301, a content management unit 302, a device management unit 303, a tenant management unit 304, a UI control unit 305, and a communication unit 306. The backup data management unit 301 manages to which tenant the backed-up data belongs and of which image forming apparatus 103 the backed-up data is. Tenant means a predetermined group to which a target apparatus belongs. For example, a sales tenant described later indicates a sales company which is a predetermined group. Also, the backup data management unit 301 manages information that should be concealed when providing an external unit with backup data. An example of backup data managed in the backup data management unit 301 is indicated in Table 1.

TABLE 1

| Backup ID | Device ID | Tenant ID | Backup Date & Time |
|---|---|---|---|
| BU001 | D001 | T002 | 2019 Dec. 12 1:23:00 |
| BU002 | D002 | T004 | 2019 Dec. 13 12:30:59 |
| BU003 | D003 | T005 | 2019 Dec. 13 23:40:11 |
| BU004 | D004 | T005 | 2019 Dec. 14 00:01:31 |

Table 1 indicates a backup data management table that the backup data management unit 301 of the management server 101 manages. Backup IDs, device IDs, tenant IDs, and backup dates and times are managed in the backup data management table. Note that each of the IDs indicated in Table 1 is represented by a short text string; however, each of the IDs is preferably managed using a UUID (Universally Unique Identifier) or the like. Also, information managed in the backup data management table is not limited to the example of Table 1, there may be an increase or decrease in the management information as necessary, and the information managed in the backup data management table may be configured to include other information.

The backup ID is identification information for uniquely identifying the backed-up data and is used for storing and acquiring backup data managed in the content management unit 302 described later.

The device ID is identification information for uniquely identifying the image forming apparatus 103 of backup origin of the backup data and is also the main key of a device data table managed by the device management unit 303 described later. Using the device ID makes it possible to identify information related to the image forming apparatus that the device management unit 303 manages. The device ID is used, for example, when generating screen information in the UI control unit 305. The tenant ID is identification information for uniquely identifying to which tenant (group) the backup data belongs in data management in a multi-tenant structure. Also, the tenant ID is the main key of a tenant table managed in the tenant management unit 304 described later. The backup date and time indicate a date and time at which the backup data was uploaded onto the management server 101 from the image forming apparatus 103. In a case of newly registering backup data, data to which a unique backup ID is assigned and information of each of the items is associated is added to the backup data management table. Note that data that has become unnecessary is preferably kept as a history considering a possibility that it may be used later when generating general-purpose data. Meanwhile, configuration may be taken such that data that has become unnecessary can be deleted from the management table by an administrator that has a predetermined authority.

The backup data management unit 301 identifies the backup data that is a request target in relation to various requests from the image forming apparatus 103 or the usage server 102 by using the data indicated in Table 1 and performs storage and/or provision of the data. For example, the backup data management unit 301, when it receives a request for storing backup data from an image forming apparatus whose device ID is D001, issues a new backup ID BU005 and manages it in association with the device ID D001 and a tenant ID T002. Also, the backup data management unit 301 requests the content management unit 302 to manage the data that is to be or was uploaded using the backup ID BU005. For example, the backup data management unit 301, when it receives a request of the backup ID BU002 from the device ID D002, acquires backup data that corresponds to BU002 from the content management unit 302 and provides it to the request origin. At this time, the backup data management unit 301 may conduct determination of whether to permit provision using the device ID or the tenant ID of request origin.

Next, an example of information that should be concealed managed in the backup data management unit 301 will be described using Table 2.

TABLE 2

| Confidential Information ID | Type of Confidential Information | Data Classification ID |
|---|---|---|
| CI001 | Address Book | d_adrsbk |
| CI002 | User Account | d_usrid |
| CI003 | Network Settings | d_network |

Table 2 indicates a confidential information management table that the backup data management unit 301 of the management server 101 manages. Information of confidential information IDs, types of confidential information, and data classification IDs is managed in the confidential information management table. Data that the backup system should make confidential information is managed in the confidential information management table. For example, when providing backup data to an external unit, since the address book that the image forming apparatus 103 has includes personal information such as email addresses, corresponding confidential information needs to be deleted at the time of providing the data. The data managed in the confidential information management table indicates information that should be deleted (i.e., information that should be concealed) at such a time of being provided to an external unit.

The confidential information ID is an ID for uniquely identifying information that should be concealed. The types of confidential information is a column for classifying the information that should be concealed into types which makes it easier for the user to determine what the information that should be concealed is and displaying it. The text string defined in the types of confidential information of Table 2 need only be easily determined by the user, and, for example, configuration may be taken so as to display in accordance with the language that the user uses in a case of displaying information of Table 2 in the UI control unit 305. For example, "Address book" indicates an address book, "User Account" indicates a user account, and "Network Settings" indicate network settings in the above Table 2. The data classification ID is an ID that is used when deleting from the backup data information to be concealed. The backup data management unit 301, in a case where, for example, the backup data is defined in an XML (eXtensible Markup Language) format, confirms whether there is an element that coincides with the data classification ID in the file and if there is, deletes the entire element. Also, information managed in the confidential information management table is not limited to the example of Table 2, there may be increase or decrease in the management information as necessary, and the information managed in the confidential information management table may be configured to include other information.

The description of FIG. 3 is returned to. The content management unit 302 is a functional unit for managing actual backup data and controls access to the storage apparatus that holds data that the management server 101 manages. Note that the storage apparatus that the content management unit 302 accesses may be an HDD, an NVRAM, or the like in the management server 101 or an external storage device that is different from the management server 101. An example of data that is managed in the content management unit 302 is indicated in Table 3.

TABLE 3

| Content ID | Backup ID | File Name |
|---|---|---|
| CT001 | BU001 | 20191212012300.zip |
| CT002 | BU002 | 20191213123059.zip |
| CT003 | BU003 | 20191213234011.zip |
| CT004 | BU004 | 20191214000131.zip |

Table 3 indicates a file information table that the content management unit 302 of the management server 101 manages. The file information table is configured to include content IDs, backup IDs, and file names. The content ID is identification information for uniquely identifying each of the files that the content management unit 302 manages. Note that this content ID may be defined by a UUID or the like. The backup ID is an ID that indicates the association with data managed in the backup data management unit 301 and is the same as the backup ID in Table 1. The file name is a file name of uploaded content. Here, a content of one file is associated in relation to one content ID; however, a plurality of files may be associated. As one example, date-hour-minute-second zip files are indicated in Table 3; however, there is no intent to limit the present disclosure.

The content management unit 302, when it is requested by the backup data management unit 301 to acquire backup data, generates a path to a corresponding file that is stored in the storage apparatus and a URI for that path and returns these to the backup data management unit 301. Also, the content management unit 302, when it accepts a file upload request from the backup data management unit 301, generates a path to a storage destination folder and a URI for uploading to the storage destination folder and returns these to the backup data management unit 301. Note that description to the effect that a URI is generated was made in the description of Table 3; however, limitation is not made to this, and configuration may be taken so as to receive the file itself. Also, the management information indicated in Table 3 is only an example and configuration may be taken so as to handle, for example, content update dates and times and/or content states such as those indicating that the content was deleted. Also, it is only necessary in the content management unit 302 to be able to determine which content is backup data, and data other than backup data may also be managed.

The description of FIG. 3 is returned to. The device management unit 303 is a functional unit for managing the image forming apparatus 103 that uploads data. The information managed in the device management unit 303 is indicated in Table 4A.

TABLE 4A

| Device ID | Serial Number | Device Name | Tenant ID |
|---|---|---|---|
| D001 | AAA12345 | Device A | 1002 |
| D002 | BBB23456 | Device B | 1004 |
| D003 | CCC34567 | Device C | 1005 |
| D004 | DDD45678 | Device D | 1005 |

Table 4A indicates a device information management table that the device management unit 303 of the management server 101 manages. Device IDs, serial numbers, device models (Device Name), and tenant IDs are managed in the device information management table. The device ID is identification information for uniquely identifying the image forming apparatus and coincides with the device ID indicated in Table 1. Note that device ID is defined by a short text string but may be defined by a UUID. The serial number is an individual identification number of each image forming apparatus and is a number assigned to each image forming apparatus. The device name indicates a group of device types in which the specifications, the types of parts used, and the like in the image forming apparatuses coincide. The tenant ID is identification information for uniquely identifying to which tenant each image forming apparatus belongs in data management in a multi-tenant structure. Note that, the information managed in the device information management table is not limited to the example of Table 4A, and there may be an increase or decrease in the management information as necessary. Also, in a case where there is no need to manage both the device ID and the serial number, configuration may be taken so as to unify management to only one of these.

The description of FIG. 3 is returned to. The tenant management unit 304 is a functional unit that manages a configuration of a multi-tenant structure in the management server 101. The information that the tenant management unit 304 manages is illustrated in Table 5A.

TABLE 5A

| Tenant ID | Type of Tenant | Parent ID | Direct/Indirect Setting | Service |
|---|---|---|---|---|
| T001 | Sales | | Direct | ServBackup, ServA, ServB |
| T002 | Customer | T001 | (Direct) | ServBackup, ServA |
| T003 | Sales | T001 | Indirect | ServBackup, ServB |
| T004 | Customer | T003 | (Indirect) | ServBackup |
| T005 | Customer | T003 | (Indirect) | ServBackup, ServA, |
| T006 | Sales | | Direct | ServBackup, ServA, ServB |

Table 5A illustrates a tenant management table that the tenant management unit 304 of the management server 101 manages. Tenant IDs, types of tenant, parent tenant IDs, direct/indirect settings, and services are managed in the tenant management table. The tenant ID is identification information for uniquely identifying a group in which user data is managed. The type of tenant is information that identifies a tenant by sales organization or customer organization and is set in accordance with each tenant. For example, a customer organization is assigned to each customer that uses each service and a sales organization is assigned to each sales company that has concluded a contract with a customer. The parent tenant ID indicates a tenant (i.e., a parent group) that is one above a target tenant with which the target tenant is associated. For example, in Table 5A, regarding the tenant ID T002, the parent tenant ID indicates T001. In other words, it is indicated that the customer tenant T002 is associated in relation to the sales tenant T001. By this, a plurality of tenants that correspond to customer organizations are associated in relation to a tenant that corresponds to a sales organization.

The direct/indirect setting is associated in relation to the sales tenant and is a setting that determines whether or not it is possible to reference information of a predetermined tenant (predetermined group) from the parent tenant for the target sales tenant (i.e., a setting that indicates information as to whether or not reference is possible). In a case of a sales tenant whose direct/indirect setting is Direct, at least some of the information related to the tenant can be referenced from the parent sales tenant. Meanwhile, in a case where the direct/indirect setting of the sales tenant is Indirect, (e.g., the tenant ID T003), information of T003 cannot be seen from the parent tenant T001. Regarding the direct/indirect setting, Direct is set in a case where a sales tenant is a group company related to the parent tenant and Indirect is set in the case of indirect sales such as with a dealer. Note that, in a case where the type of tenant is a customer tenant, the direct/indirect setting of the parent tenant is inherited. For example, regarding the tenant ID 002, the type of tenant is customer tenant, the direct/indirect setting of T001 which is defined as a parent tenant is inherited, and Direct is designated. In Table 5A, in a case where the direct/indirect setting of the parent tenant is inherited, the direct/indirect setting is indicated in parentheses. The service indicates what kind of services (e.g., a cloud service) a target tenant can use. In Table 5A, that there is a right to use a service that uses a backup function of the image forming apparatus 103 is indicated as ServBackup. Also, it is indicated that services such as Serv A and/or Serv B can be used by the tenants.

Figure 4A:
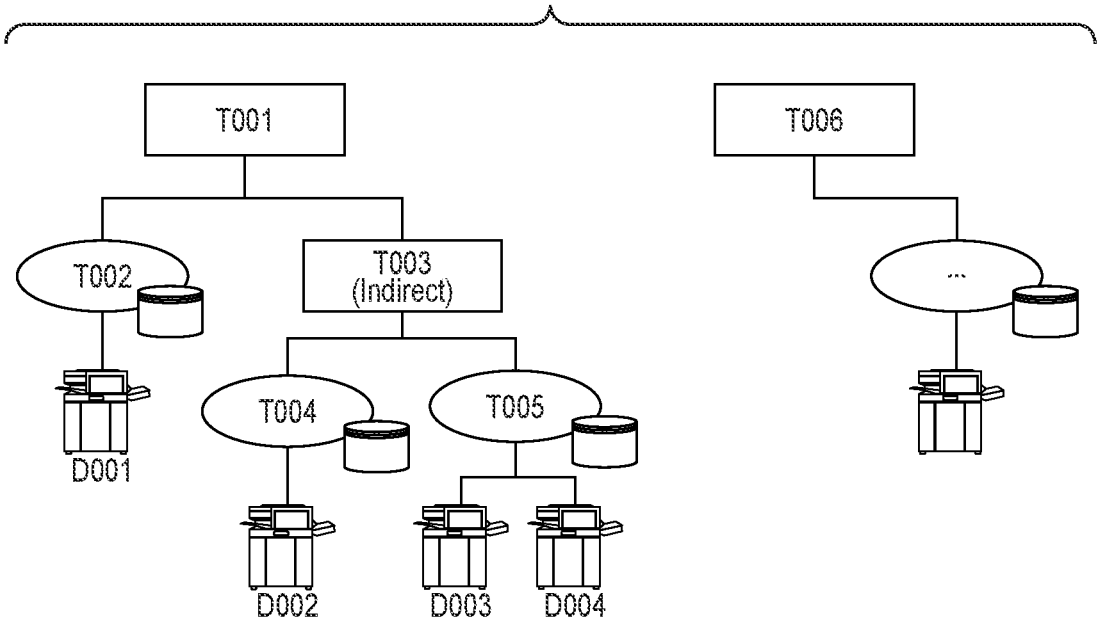
FIG. 4A and FIG. 4B are views illustrating examples of multi-tenant structures according to the embodiment.

What illustrates the definition content of the tenant management table indicated in Table 5A is illustrated in FIG. 4A. FIG. 4A illustrates the multi-tenant structure indicated in Table 5A that the tenant management unit 304 of the management server 101 manages.

Under T001 which is set to Direct, the customer organization T002 and the sales organization T003 which is Indirect are associated. Furthermore, D001 which is an image forming apparatus is associated with T002. Also, the customer organizations T004 and T005 are associated under T003, and D002 which is an image forming apparatus is associated with T004, and D003 and D004 which are image forming apparatuses are associated with T005. Each image forming apparatus manages backup data in association with its parent tenant.

The description of FIG. 3 is returned to. The UI control unit 305 is a functional unit that generates a Web screen that is displayed in a case where the management server 101 is accessed from a client PC (not shown) or the like. In other words, the management server 101 has a Web server function. When generating a screen, it must be possible for the tenant to which the operating user belongs to use the backup service. For example, there is a tenant list screen (not shown) as a screen that is generated in the UI control unit 305. When the operating user logs in to T001, the UI control unit 305 generates a screen that displays the tenants (i.e., T002 and T003) whose parent tenant corresponds to T001 in Table 5A. Similarly, a list of devices associated with the customer tenants in Table 4A, a list of backup data associated with the device ID in Table 1, a screen for registering the confidential information in Table 2, and the like may be generated.

The communication unit 306 performs communication with the image forming apparatus 103 and the usage server 102 and communication with an external unit via a network. For example, when a backup request from the image forming apparatus 103 is accepted, the communication unit 306 transmits the request to the backup data management unit 301. In addition, when a restoration request from the image forming apparatus 103 is accepted, the communication unit 306 transmits the request to the backup data management unit 301 and returns to the image forming apparatus 103 a URI received from the backup data management unit 301 as a response. Note that each functional unit of the content management unit 302, the device management unit 303, and the tenant management unit 304 is not limited to the example of FIG. 3 and may be configured outside the management server 101 as another server.

The usage server 102 is a server that requests, in relation to the management server 101, to acquire backup data of the image forming apparatus 103 and has a service provision unit 321, an interservice cooperation unit 322, and a communication unit 323. The service provision unit 321 is a functional unit that controls services that the usage server 102 provides. For example, in a case where the usage server 102 is used as the initial installation system, services such as generation, storage, and usage of data for initial installation are provided in the service provision unit 321. More specifically, the service provision unit 321 provides to the user a UI for generating data for initial installation and makes detailed setting of each data possible. Also, in the UI, a UI for acquiring backup data from the backup data management server 101 is provided and a function that uses the backup data is provided. Also, a function that stores within the usage server 102 the generated data and transfers the data in relation to the data request from an installation data support function within the image forming apparatus 103 is provided.

The interservice cooperation unit 322 has a function for cooperating with an external service of the usage server 102. For example, the interservice cooperation unit 322 is responsible as an intermediary for when acquiring backup data from the aforementioned management server 101. The communication unit 323 controls communication via a network with the management server 101 and the image forming apparatus 103. Communication with the PC on which the user performs the operations and the like for displaying data in a client application for editing installed on the PC on which the user performs the operations and the like can be given as communication with the external unit in a case of, for example, the initial installation system.

The image forming apparatus 103 has a backup function 350 that performs a backup request, a restoration request, or the like in relation to the management server 101. The backup function 350 has a communication unit 351, a UI control unit 352, and a processing unit 353. Note that each functional unit of the image forming apparatus 103 illustrated in FIG. 3 is realized by the CPU 201 of the image forming apparatus 103 executing a control program.

The communication unit 351 controls communication via a network with the management server 101 and the usage server 102. The UI control unit 352 provides to the user via the UI display apparatus 207 a UI (not shown) for operating the backup function 350 and accepts user operations. In the UI, for example, a button for the user to instruct backup of setting values in relation to the image forming apparatus 103 is displayed. Also, a list of backup data or a restoration button for the user to restore setting values in relation to the image forming apparatus 103 is displayed on the UI. The processing unit 353 executes the backup processing in accordance with an instruction accepted via the UI control unit 352 and the communication unit 351. For example, the processing unit 353, when it receives a backup instruction from the user in the UI control unit 352, transmits the backup request to the management server 101 via the communication unit 351. Also, the processing unit 353 collects information in the image forming apparatus 103 that should be backed up and once these are collected, uploads these to the management server 101 as backup data. Note that the software configuration of the backup system described in FIG. 3 is an example, and there may be increase or decrease in the functional units as necessary. Also, regarding a communication destination within the system, there may also be increase or decrease as necessary.

<Usage of Backup Data>

An example of usage of backup data in the present embodiment will be described below. In the present embodiment, the usage server 102 will be described as a server that realizes the initial installation system. Of course, the usage server 102 may be a server that realizes other functions using the backup data. Note that in the initial installation system, it is assumed that the installation data that should be applied in relation to the image forming apparatus 103b is generated based on the backup data from the image forming apparatus 103a. In other words, the initial installation system which is the usage server 102 acquires the backup data from the management server 101 and generates installation data using the acquired backup data.

<Usage Sequence>

An example in which a user who belongs to a sales organization (the sales tenant T00) conducts initial installation of the image forming apparatus 103 in place of the customer will be described below as a use case in the present embodiment. Assume that at this time, the backup data of the currently used image forming apparatus D001 at the customer tenant T002 under the sales tenant to which the user belongs is used. A usage sequence of backup data in the present embodiment will be described with reference to FIG. 5. Note that the user may directly operate the usage server 102 or may use the usage server 102 by accessing it from a PC of the user on which the user performs the operations. In a case of accessing the usage server 102 from a PC on which the user performs the operations, the PC of the user functions as a Web client and the usage server 102 functions as the Web server and provides screen information to the PC on which the user performs the operations. Accordingly, it will be described below that a predetermined screen is displayed on the display apparatus of the usage server 102; however, assume that in a case where the user performs operations using a PC, the screen is displayed on a Web browser of the PC on which the user performs the operations.

In step S500, the usage server 102 accepts login from the user. At this time, the usage server 102 displays on the display apparatus a login screen 600 described later in FIG. 6A. In the login processing in step S500, authentication processing is executed using an access token issued by the usage server 102 or the authentication server (not shown).

Next in step S501, the usage server 102 accepts from the user an instruction to use the backup data via the input apparatus 215. In the instruction to use the backup data, a serial number that designates which backup data of the image forming apparatus 103 to acquire is included. Examples of screens to be displayed on the display apparatus at this time are illustrated in FIG. 6B and FIG. 6C. Details of these screens will be described later.

Then in step S502, the usage server 102 requests a list of backup data associated with the serial number designated in relation to the management server 101. When acquiring the list of backup data, provision of the operation user's access token makes it possible to determine in the management server 101 whether to permit acquisition of backup data. In other words, in the request in step S502, the access token of the operation user who performed the usage instruction is included in addition to the serial number.

In step S503, the backup data management unit 301 of the management server 101 searches for the backup data associated with the designated serial number and then generates a list of selectable backup data. Detailed processing in step S503 will be described later using FIG. 7. Next in step S504, the management server 101 returns to the usage server 102 which is the request origin the list of selectable backup data generated in step S503.

In step S505, the usage server 102, when it acquires the list of backup data, displays in relation to the user a screen of the list of selectable backup data. The screen to be displayed at this time will be described later in FIG. 6D. The user can select the backup data that they wish to acquire from the displayed list of backup data via the screen of the list of backup data. In step S506, the usage server 102 accepts the selection of backup data that the user wishes to acquire.

Next, in step S507, the usage server 102 requests the management server 101 for the backup data that the user selected. The usage server 102, in the backup data acquisition request, notifies the management server 101 with the backup ID and the user's access token.

In step S508, the management server 101 extracts from the storage apparatus in the management server 101 the backup data associated with the backup ID notified in step S507. Detailed processing in step S508 will be described later using FIG. 9. In step S509, the management server 101 provides the usage server 102 which is the request origin with the backup data retrieved in step S508. Next in step S510, the usage server 102, when it acquires the backup data, notifies in relation to the user of the acquisition and ends the present sequence.

Screen Examples

Next, examples of screens that the usage server 102 according to the present embodiment displays will be described with reference to FIG. 6A to FIG. 6E. Note that it is assumed that regarding each of the screens illustrated in FIG. 6A to FIG. 6E, the service provision unit 321 of the usage server 102 generates these and displays these on the display apparatus of the usage server 102 or the Web browser on the PC on which the user performs operations. However, the present disclosure is not limited to this and may also be a client application installed on the PC on which the user performs operations. Note that here, the service provision unit 321 of the usage server 102 ultimately generates various screens; however, the screen information which is a basis of screen generation is something that the UI control unit 305 of the management server 101 provides. Accordingly, configuration may be taken such that the UI control unit 305 of the management server 101 generates various screens as user interfaces, provides the generated screen information to the usage server 102 or the PC on which the user performs the operations and causes the usage server 102 or the PC on which the user performs the operations to display the generated screen information.

Figure 6A:
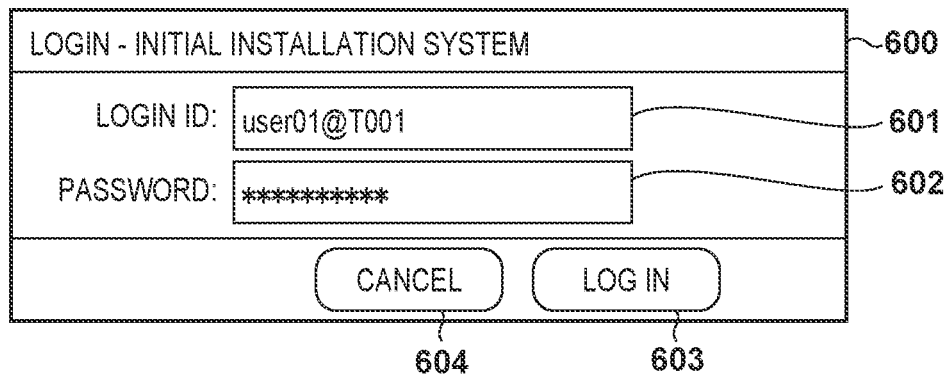
FIG. 6A to FIG. 6E are views illustrating examples of UIs of a usage server 102 according to the embodiment.
Figure 6B:
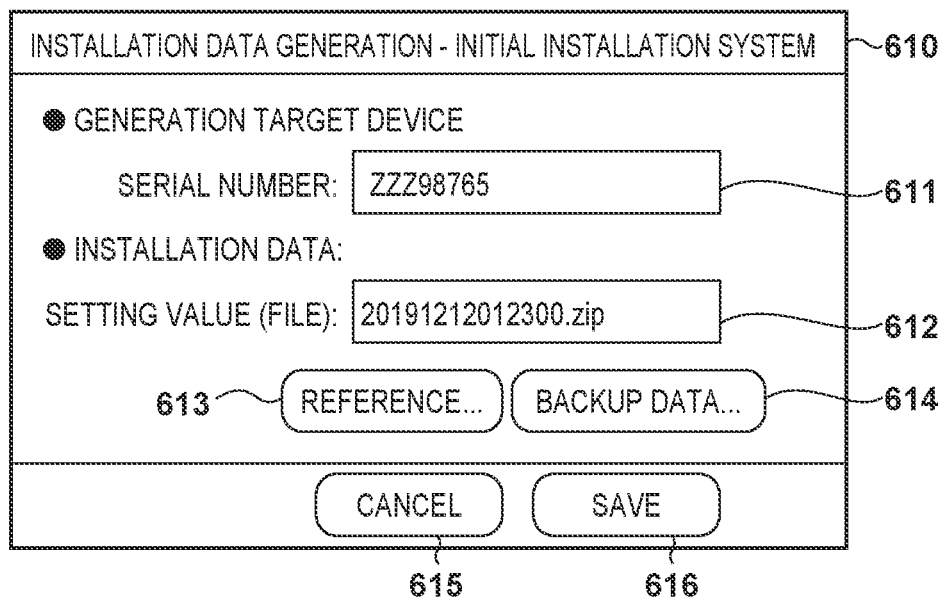
Figure 6C:
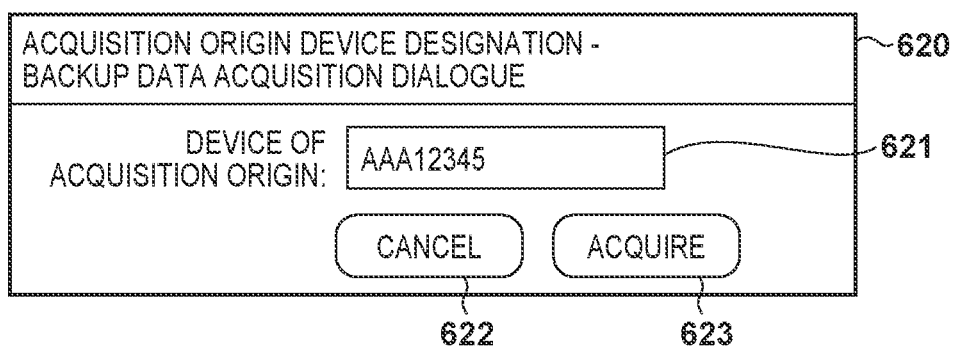

FIG. 6A is the login screen 600 that the usage server 102 displays and is configured to include text boxes 601 and 602 for inputting a login ID and a password, a login button 603, and a cancel button 604. The user can use the services that the usage server 102 provides by inputting a login ID and a password into the respective text boxes 601 and 602 and then operating the login button 603. When the cancel button 604 is operated, transition is made to a screen before the transition without performing login.

FIG. 6B is an example of an installation data generation screen 610 that the usage server 102 displays after login. The installation data generation screen 610 includes a serial number input unit 611, a file name display unit 612, a reference button 613, a backup data acquisition button 614, a cancel button 615, and a save button 616. The serial number input unit 611 is a field for inputting a serial number of the image forming apparatus 103b which is a data application target. The file name display unit 612 is a field that displays a file name of a setting value to be applied to the image forming apparatus 103b as installation data. Regarding the file displayed in the file name display unit 612, the file can be designated or acquired by operating the reference button 613 or the backup data acquisition button 614 described later. The file name display unit 612 may be configured so as to change the displayed file name to a desired file in accordance with a user input.

The reference button 613 is a button for designating a local file that exists on the PC on which the user performs the operations. A file designation dialogue opens when the reference button 613 is operated and a file can be designated. The usage server 102 displays the installation data generation screen 610 when a file is designated and displays a file name on the file name display unit 612. The backup data acquisition button 614 is a button for starting processing of acquiring backup data from the management server 101. The usage server 102 displays a backup data acquisition dialogue of FIG. 6C when the backup data acquisition button 614 is operated. The cancel button 615 is a button for cancelling generation of installation data. Edits up until that point are discarded when the cancel button 615 is operated after the installation data generation screen 610 is displayed. Regarding the save button 616, installation data content operated in the period from when the installation data generation screen 610 is displayed until when the save button 616 is operated is uploaded in relation to the usage server 102 and then stored. Note that configuration may be taken so as to temporarily store in a storage apparatus (not shown) of the PC on which the user performs the operations without uploading to the usage server 102 in a case where the screen illustrated in FIG. 6 is displayed in the client application.

FIG. 6C is a designation screen 620 in the backup data acquisition dialogue for designating which backup data of the image forming apparatus to acquire in relation to the management server 101. The designation screen 620 is configured to include an acquisition origin device designation unit 621, a cancel button 622, and an acquisition button 623. The acquisition origin device designation unit 621 designates a serial number of the image forming apparatus 103 to be a backup data acquisition target. In the example of FIG. 6C, "AAA12345" is designated as the serial number of the image forming apparatus. The cancel button 622 is a button for closing the designation screen 620 and returning to the installation data generation screen 610 of FIG. 6B. The acquisition button 623 is a button for requesting in relation to the management server 101 the backup data related to the serial number designated in the acquisition origin device designation unit 621. Upon operation of this button, the usage server 102 executes the processing in steps S501 and S502 illustrated in FIG. 5.

Figure 5:
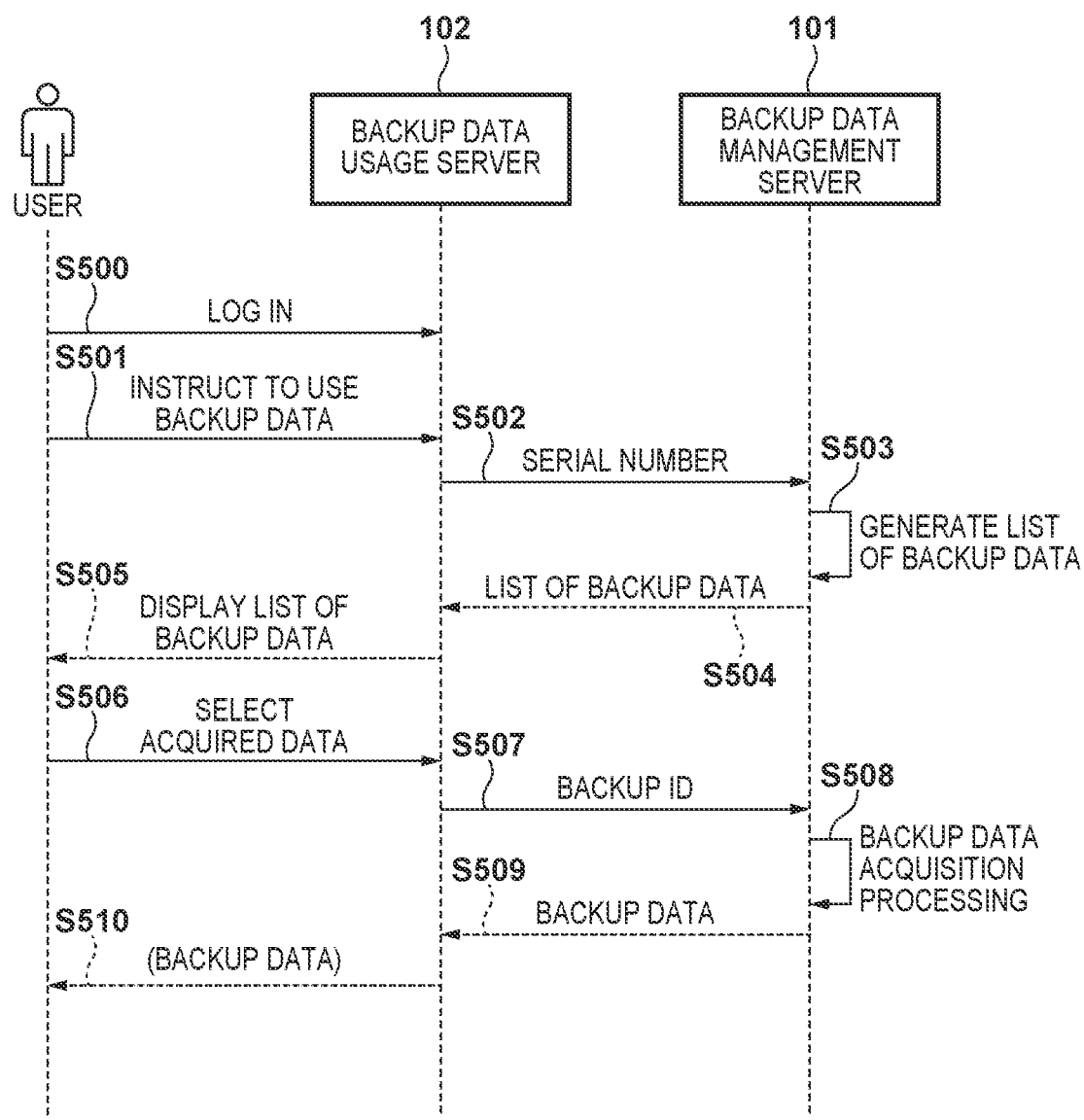
FIG. 5 is a view illustrating an overall sequence at a time of providing backup data according to the embodiment.
Figure 6D:
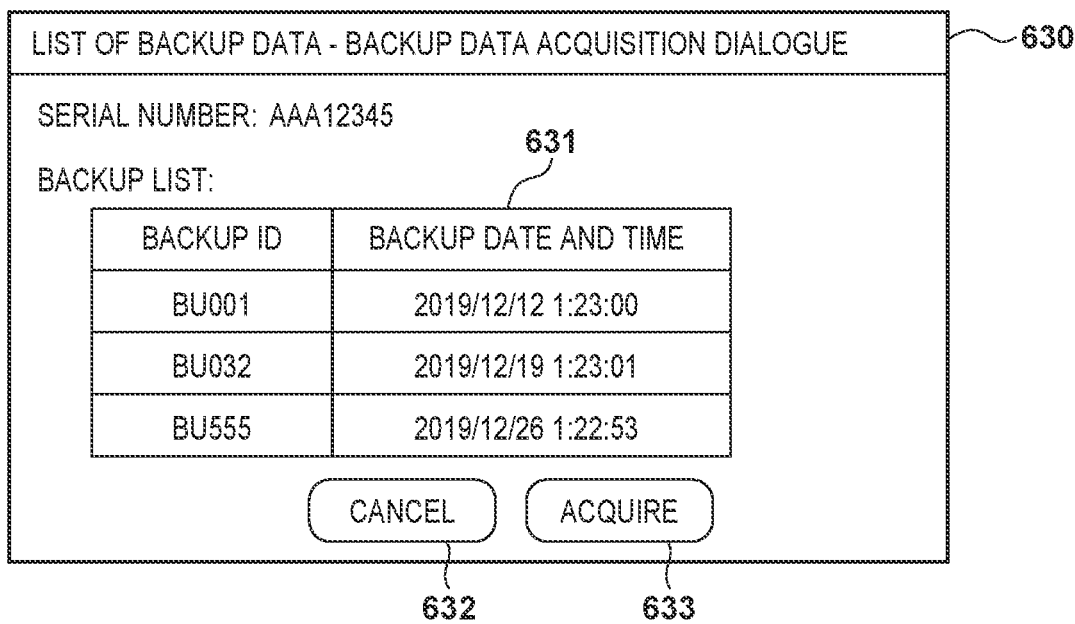

FIG. 6D is a backup data list screen 630 that the usage server 102 displays in the backup data acquisition dialogue. The content displayed on the backup data list screen 630 is a list of backup data acquired in the processing in steps S503 and S504 of FIG. 5. The backup data list screen 630 is configured to include a backup list 631, a cancel button 632, and an acquisition button 633. The backup list 631 displays backup data associated with the image forming apparatus 103 designated in the acquisition origin device designation unit 621 of FIG. 6C. For example, backup data that corresponds to the serial number "AAA12345" (i.e., the device ID D001) is searched for from a table as indicated in the above Table 1 and displays all corresponding backup data. Note that backup ID and backup date and time are illustrated as content to be displayed; however, there is no intent to limit the present disclosure. For example, configuration may be taken so as to display a backup method that indicates whether the backup is that for which backup was manually instructed or backup is regularly performed on a schedule. Also, the backup ID does not need to be displayed in a case where it is determined to be unnecessary data for the user. This display content can be changed by the user who has a predetermined operation authority such as an administrator. The cancel button 632 is a button for closing the backup data list screen 630 and returning to the installation data generation screen 610 of FIG. 6B. The acquisition button 633 is a button for requesting in relation to the management server 101 the backup data designated in the backup list 631. The processing in step S506 of FIG. 5 is executed by the acquisition button 633 being operated.

Figure 6E:
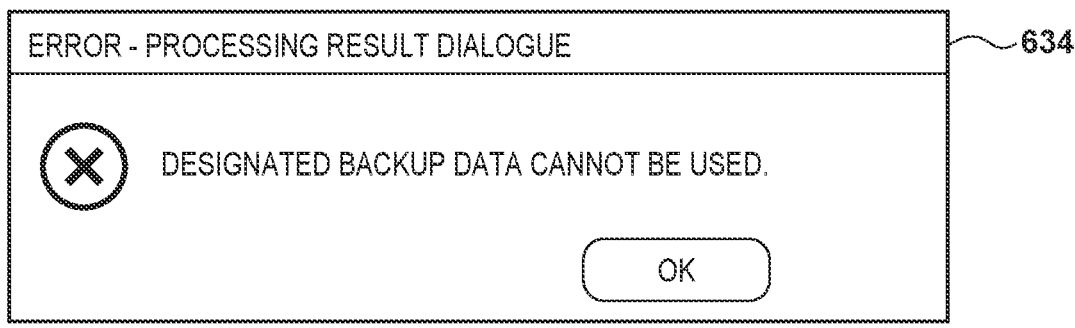

FIG. 6E is an example of an error screen 634 that the usage server 102 displays. The error screen 634 is a screen that the usage server 102 displays when, for example, an error is notified in step S705 of FIG. 7 described later.

Example of backup data usage screens in the usage server 102 were described with reference to FIG. 6A to FIG. 6E; however, there is no intent to limit the present disclosure, and there may be increase or decrease in the displayed data, fields, and the like as necessary.

<Flow for Acquiring List of Backup Data>

Next, a processing procedure of an acquisition flow for acquiring a list of backup data of the management server 101 in the present embodiment will be described with reference to FIG. 7. The present processing flow is detailed processing of the above step S503 of FIG. 5. Note that the processing flow illustrated in FIG. 7 is processing that the backup data management unit 301 of the management server 101 mainly conducts unless otherwise mentioned. Accordingly, processing described below is realized by, for example, the CPU 211 of the management server 101 reading out to the RAM 212 and executing a control program stored in the storage apparatus 214 such as the ROM or the HDD. Also, the processing flow illustrated in FIG. 7 starts the processing using as a trigger a request from the usage server 102 such as in step S502.

In step S700, the backup data management unit 301 acquires information of a tenant that is a request origin and to which the user belongs. The backup data management unit 301 can acquire information of a tenant to which the user belongs from information such as an access token added at the time of the request. However, the present disclosure is not limited to this and configuration may be taken such that the ID of a tenant to which the user belongs or the like is added at the time of the request and the backup data management unit 301 simply acquires as information of the tenant of request origin a value that was added to the access token.

Next in step S701, the backup data management unit 301 acquires from the serial number of a backup data acquisition target designated at the time of the request information of a tenant to which the image forming apparatus of the serial number belongs. Specifically, the backup data management unit 301 acquires a device ID from Table 4A based on the serial number and acquires a tenant ID from Table 1 based on the device ID.

In step S702, the backup data management unit 301 confirms the relationship of the tenant of request origin and the tenant to which the target image forming apparatus belongs. Specifically, the backup data management unit 301 confirms whether or not the requesting user has a right to reference the tenant to which the target image forming apparatus belongs. Here, a detailed processing flow in step S702 will be described with reference to FIG. 8.

FIG. 8 is a processing flow for confirming the relationship of the tenant of request origin and the tenant to which the target image forming apparatus belongs. The processing described below is realized by, for example, the CPU 211 of the management server 101 reading out to the RAM 212 and executing a control program stored in the storage apparatus 214 such as the ROM or the HDD. Note that information designated in each view of FIG. 6A to FIG. 6E will be used in the description of FIG. 8. In other words, the operation user is a user that belongs to the tenant ID T001 and the device that is the target of backup data acquisition is the serial number AAA12345.

In step S800, the backup data management unit 301 determines whether or not the tenant of request origin and the tenant of the image forming apparatus to be an acquisition target are the same. In a case where it is determined that they belong to the same tenant, the processing transitions to step S803, and in a case where it is determined that they are not the same tenant, the processing transitions to step S801.

In step S801, the backup data management unit 301 determines whether or not the tenant of request origin belongs to the upper tenant of the tenant of the image forming apparatus to be an acquisition target. In a case where it is determined that the tenant is an upper tenant, the processing transitions to step S802, and in a case where it is determined that the tenant is not an upper tenant, the processing transitions to step S804.

Here, the determination in the above steps S800 and S801 will be described using as an example various kinds of information designated in the UIs illustrated in FIG. 6A to FIG. 6E. In the UI illustrated in FIG. 6A, the user (i.e., a login user) who is a request origin belongs to the sales tenant T001. Meanwhile, the image forming apparatus to be the acquisition target is the serial number "AAA12345" and is understood to belong to T002 by comparing against Table 4A. From tenant information of Table 5A and FIG. 4A, it is understood that T001 to which the user of request origin belongs is the upper tenant of the tenant T002 of the target image forming apparatus, is determined as not the same tenant in step S800, and is determined as the upper tenant in step S801.

In step S802, the backup data management unit 301 determines whether or not the tenant to which the image forming apparatus to be the acquisition target belongs is a customer tenant that belongs under the sales tenant whose direct/indirect setting is Direct. The direct/indirect setting Direct is a setting that enables referencing of some information (in case of the processing flow of FIG. 8, backup data) related to the lower tenant from the upper tenant (parent tenant). In a case where the tenant to which the image forming apparatus to be the acquisition target belongs is under Direct and it is determined that the backup data can be acquired, the processing transitions to step S803. Meanwhile, in a case of Indirect, the information of T003 cannot be referenced from T001, which is the parent tenant. Accordingly, the processing is transitioned to step S804 and an error is displayed.

In step S803, the backup data management unit 301, since it was determined that information provision is possible, notifies that there is no problem in the tenant relationship to the call source of the processing and ends the present processing flow. Meanwhile in step S804, the backup data management unit 301 determines that the tenant relationship is that in which information provision is not possible and returns an error to the call source of the processing. Alternatively, in a case where the tenant to which the image forming apparatus of the acquisition target belongs is Indirect, the backup data management unit 301 similarly determines that information provision is not possible, notifies an error to the call source of the processing, and ends the present processing flow.

The description of FIG. 7 is returned to. In step S703, the backup data management unit 301 determines whether or not it is possible to provide a list of backup data based on the above step S702 (i.e., the tenant relationship confirmation result of FIG. 8). If there is no problem in the above relationship, it will be determined that provision is possible and the processing will be transitioned to step S704, and if there is a problem in the above relationship, it will be determined that provision is not possible and the processing will be transitioned to step S705.

In step S704, the backup data management unit 301 collects backup data information related to the acquisition target device from the backup data management table. Furthermore, the backup data management unit 301 draws up a list of collected data when backup data information is collected, provides it to the request origin, and ends the processing.

Meanwhile in step S705, the backup data management unit 301, since it was determined in step S703 that a list of backup data cannot be provided, notifies in relation to the request origin that backup data cannot be acquired and ends the present processing flow. When an error is notified in step S705, the usage server 102 displays the error screen illustrated in FIG. 6E, for example.

<Flow for Acquiring Backup Data>

Figure 9:
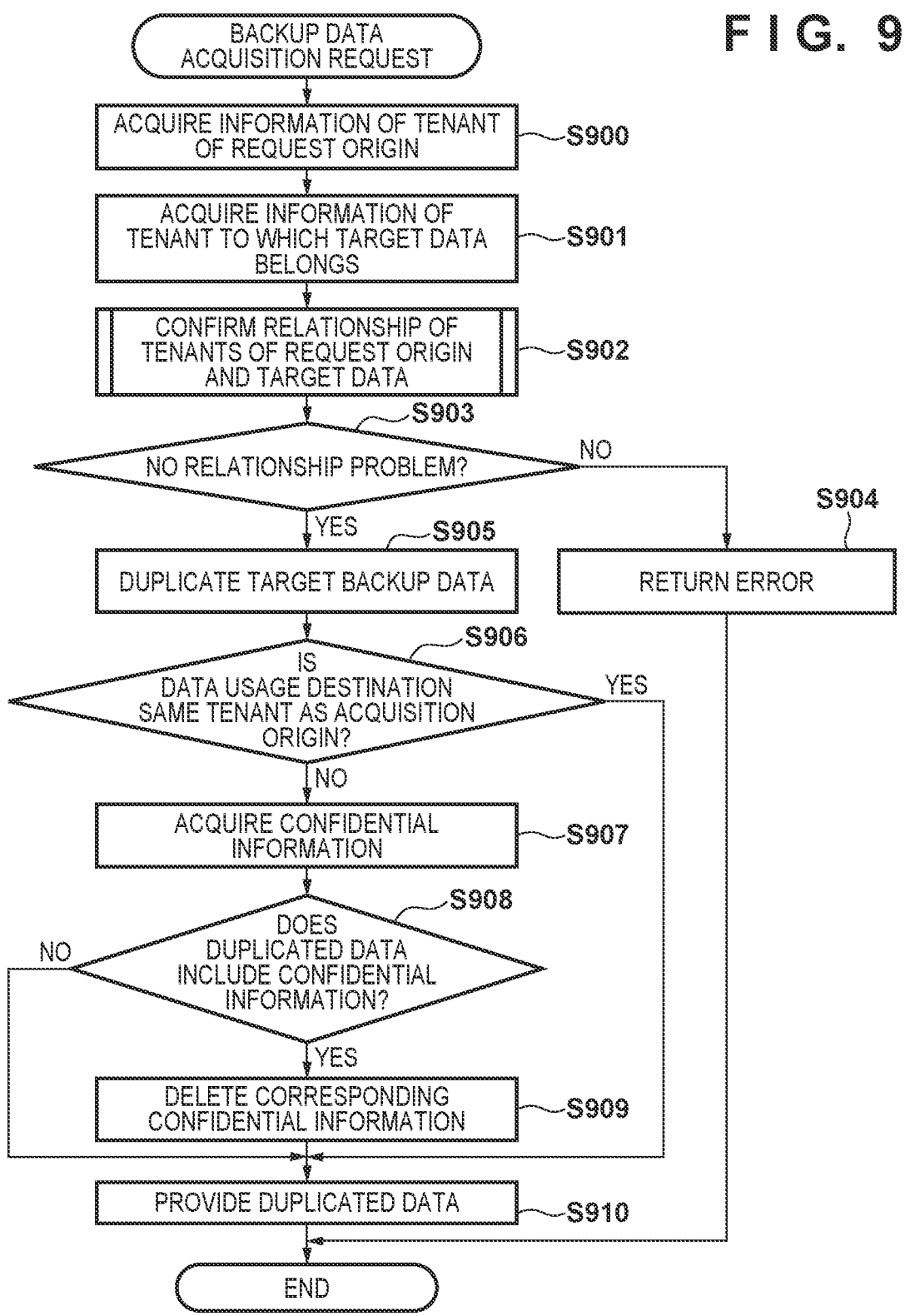
FIG. 9 is a view illustrating a processing flow for acquiring backup data according to the embodiment.

Next, a processing procedure of a flow for acquiring backup data of the management server 101 in the present embodiment will be described with reference to FIG. 9. The present processing flow is detailed processing in step S507 of FIG. 5. Note that the processing flow illustrated in FIG. 9 is processing that the backup data management unit 301 of the management server 101 mainly conducts unless otherwise mentioned. The processing described below is realized by, for example, the CPU 211 of the management server 101 reading out to the RAM 212 and executing a control program stored in the storage apparatus 214 such as the ROM or the HDD. Also, the processing flow illustrated in FIG. 9 starts the processing using as a trigger a request from the usage server 102 such as in step S506.

In step S900, the backup data management unit 301 acquires information of a tenant that is a request origin and to which the user belongs. Specifically, the backup data management unit 301 can acquire information of a tenant to which the user belongs from information such as an access token added at the time of the request. However, the present disclosure is not limited to this and configuration may be taken such that the ID of a tenant to which the user belongs or the like is added at the time of the request and the backup data management unit 301 simply acquires, as information of the tenant of request origin, a value that was added to the access token.

In step S901, the backup data management unit 301 acquires, from a backup ID that uniquely identifies the backup data designated at the time of the request information of a tenant to which the backup data belongs. Specifically, the backup data management unit 301 acquires based on the backup ID the tenant ID from Table 1.

In step S902, the backup data management unit 301 confirms the relationship of the tenant of request origin and the tenant to which the target image forming apparatus belongs. Specifically, the backup data management unit 301 confirms whether or not the requesting user has a right to reference the tenant to which the target image forming apparatus belongs. Regarding the detailed processing flow in step S902, description will be omitted as it is the same as the processing described above using FIG. 8.

In step S903, the backup data management unit 301 determines whether or not it is possible to provide backup data based on the above step S902 (i.e., the tenant relationship confirmation result of FIG. 8). If there is no problem in the above relationship, it will be determined that provision is possible and the processing will be transitioned to step S905 and if there is a problem in the above relationship, it will be determined that provision is not possible and the processing will be transitioned to step S904.

In step S904, the backup data management unit 301, since it was determined in step S903 that backup data cannot be provided, notifies in relation to the request origin that backup data was not acquired and ends the present processing flow. When an error is notified in step S705, the error screen illustrated in FIG. 6E displayed in the usage server 102, for example.

Meanwhile in step S905, the backup data management unit 301 acquires the backup data that corresponds to the backup ID included in the request and duplicates the target backup data for provision. Next in step S906, the backup data management unit 301 determines whether or not the tenant of backup data usage destination is the same as the tenant of backup data acquisition origin. The tenant of backup data usage destination uses the serial number of the backup data usage destination designated in the serial number input unit 611 of FIG. 6B, for example. This information may be, for example, notified together with the backup ID at the time of the request. Also, there is a possibility that usage destination designation may not be possible depending on the usage server 102. In such a case, it is determined in step S906 that the usage destination is different. If it is determined that the tenant of data usage destination and the tenant of data acquisition origin are the same, the processing will be transitioned to step S910, and if it is determined that they are different, the processing will be transitioned to step S907.

In step S907, the backup data management unit 301 acquires information of the confidential information management table indicated in Table 2. Next in step S908, the backup data management unit 301 confirms whether or not confidential information is included in the backup data that corresponds to the backup ID duplicated in step S905. In a case where confidential information is included in the confirmed data, the processing is transitioned to step S909 and in a case where it is not included, the processing is transitioned to step S910.

In step S909, the backup data management unit 301 deletes the corresponding confidential information from among the duplicated backup data. Here, information in the file is deleted based on the data classification ID of Table 2, for example. Next in step S910, the backup data management unit 301 provides to the request origin the duplicated backup data and ends the present processing flow.

The above is the processing flow for when providing backup data. Note that the processing flow described in FIG. 9 is an example, and there may be increase or decrease in the processing as necessary. Note that in the present embodiment, control that deletes only confidential information was described; however, there is no intent to limit the present disclosure and, for example unnecessary setting data may be deleted. For example, in a case where data that defines a configuration of a shared folder for external publication is unnecessary among the setting values, the corresponding files are also deleted.

As described above, the information processing apparatus according to the present embodiment manages backup data that can be used as installation data for when installing an apparatus and receives a request from an external apparatus. Also, the present information processing apparatus, in a case where the received request is a request for acquiring backup data, generates, by using the backup data, the installation data to be provided based on information associated with the request origin and information associated with the acquisition origin of the backup data. Furthermore, the present information processing apparatus, based on a relationship of the information associated with the request origin and the information associated with the acquisition origin, deletes, as necessary, from the generated installation data, information to be concealed, and then provides the request origin with the installation data. By this, backup data can be provided having considered in accordance with the tenant of request origin whether to permit provision and whether to delete confidential information even in a case where there is a backup data request from what is other than the acquisition origin of backup data. Accordingly, by virtue of the present embodiment, it is possible to suitably control in accordance with a request origin provision of confidential information that is included in backup data when providing the backup data to be used in setting an apparatus.

Second Embodiment

A second embodiment of the present disclosure will be described below. In the above first embodiment, a method of defining confidential information and performing provision permission/prohibition and deletion of confidential information in the management server 101 depending on the tenant of backup data request origin was described. However, a definition of the confidential information is different depending on the customer who is an owner of the backup data. Also, there is a possibility that the definition may be different due to a setting of the image forming apparatus designated for each customer. For example, in a case where there is a digital signage function in the image forming apparatus, there is a possibility that a server that acquires display data may be different depending on the customer. A certain customer may be referencing a general-purpose server on the Internet. Meanwhile, there is a possibility that another customer may acquire display data from a server that the customer themself provided. In a case of designating a server of a customer, the customer wishes to have data as confidential information; however, in the configuration of the above first embodiment, the setting of the digital signage function cannot be deleted. Accordingly in the present embodiment, a method of enabling definition of confidential information for each customer will be described. Note that in the present embodiment, regarding configurations and control that are the same as the above first embodiment, the same reference numeral will be assigned and description will be omitted, and configurations and control that are different will be mainly described.

An example of information that should be concealed of each customer managed by the backup data management unit 301 is indicated in Table 6.

TABLE 6

| Confidential Information ID | Type of Confidential Information | Data Classification ID |
| --- | --- | --- |
| CI001-T002 | Digital Signage | d_signage |

Table 6 indicates a confidential information management table of each customer that the backup data management unit 301 of the management server 101 manages, and a confidential information ID, a type of confidential information, and a data classification ID are managed. The description of each column in Table 6 is the same as Table 2 and thus will be omitted. Note that, the information managed in the confidential information management table is not limited to the example of Table 6, and there may be increase or decrease in the management information as necessary. Also, regarding the confidential information, it is only necessary in the management of backup data that what is jointly used and what is defined for each customer are separately managed, and Table 2 and Table 6 may be merged and provided.

<Flow for Acquiring Backup Data>

Figure 10:
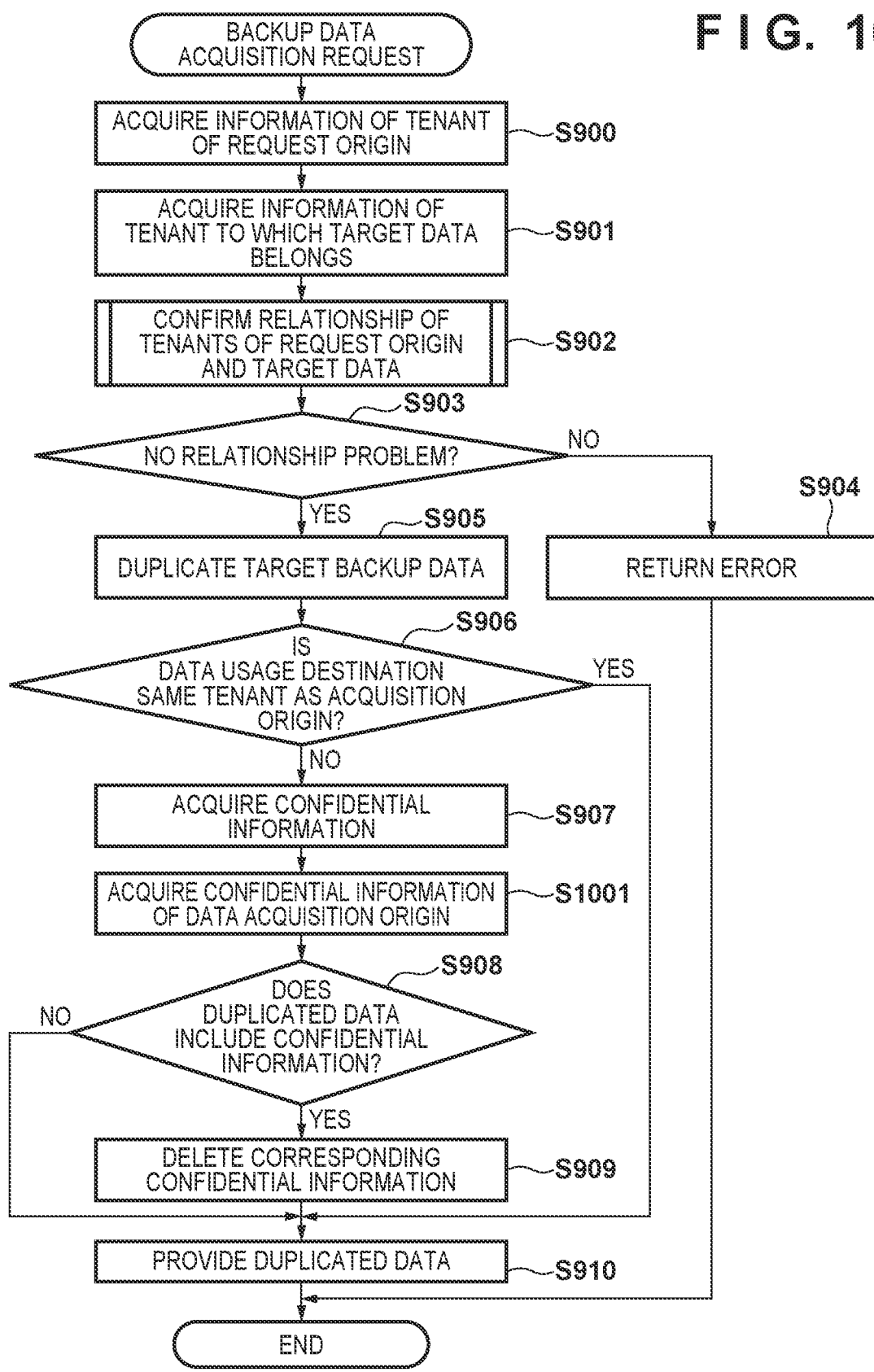
FIG. 10 is a view illustrating a processing flow for acquiring backup data according to the embodiment.

Next, a processing procedure of a flow for acquiring backup data of the management server 101 in the present embodiment will be described with reference to FIG. 10. The present processing flow is detailed processing in step S507 of FIG. 5. Note that the processing flow illustrated in FIG. 10 is processing that the backup data management unit 301 of the management server 101 mainly conducts unless otherwise mentioned. The processing described below is realized by, for example, the CPU 211 of the management server 101 reading out to the RAM 212 and executing a control program stored in the storage apparatus 214 such as the ROM or the HDD. Also, the processing flow illustrated in FIG. 10 starts the processing using as a trigger a request from the usage server 102 such as in step S506. Note that description will be omitted as the processing in steps S900 to S910 is the same processing. A point of difference is that the processing in step S1001 has been added after the processing in step S907.

In step S1001, the backup data management unit 301 acquires information of the confidential information management table of confidential information (Table 6) defined by a tenant (data acquisition origin) associated with a backup ID. The confidential information of each customer who is the data acquisition origin acquired in step S1011 is used together with the confidential information acquired in step S907. In other words, the confidential information included in the confidential information acquired in steps S1001 and S907 will be deleted from the duplicated data in step S909.

As described above, by virtue of the present embodiment, enabling to define the confidential information for each customer makes it possible to provide data after deleting customer-dependent confidential information as well from the backup data.

Third Embodiment

A third embodiment of the present disclosure will be described below. In the above first and second embodiments, methods of determining whether to permit provision in accordance with the tenant of acquisition origin of backup data were described. However, in a case of companies with global customers and the like, there are cases where tenant relationships cannot be maintained and thus cannot be referenced for the reason that customer organizations (customer tenants) are created under sales organizations (sales tenants). For example, there are cases where a sales tenant of Japan wishes to use the backup data associated with a customer tenant under a sales tenant of the US and apply the backup data to an image forming apparatus associated with a customer tenant which is a global company. In such a case, the sales tenants are different; accordingly, in the above first and second embodiments, the backup data cannot be used due to the tenants being different. Accordingly in the present embodiment, a method in which an authority that enables referencing is provided only to specific customer tenants or image forming apparatuses and provision of backup data is enabled in a case where there is an authority that enables referencing will be described. Note that in the present embodiment, regarding configurations and control that are the same as the above first and second embodiment, the same reference numeral will be assigned and description will be omitted, and configurations and control that are different will be mainly described.

An example of device information that the device management unit 303 manages is indicated in Table 4B.

TABLE 4B

| Device ID | Serial Number | Device Name | Tenant ID | Sharing |
|---|---|---|---|---|
| D001 | AAA12345 | Device A | T002 | |
| D002 | BBB23456 | Device B | T004 | |

TABLE 4B-continued

| Device ID | Serial Number | Device Name | Tenant ID | Sharing |
|---|---|---|---|---|
| D003 | CCC34567 | Device C | T005 | |
| D004 | DDD45678 | Device D | T005 | T006 |

Table 4B indicates a device information management table that the device management unit 303 of the management server 101 manages and device IDs, serial numbers, device models (Device Name), tenant IDs, and sharing are managed. Note that what is the same as Table 4A will be omitted in the description of each of the columns in Table 4B.

The sharing (sharing information) is a column that indicates whether a setting that enables an image forming apparatus managed in the device information management table to reference in relation to any tenant has been made. For example, in a case of the device ID D004, it is indicated that referencing is enabled in relation to a tenant that corresponds to the tenant ID T006. The sharing setting is performed on a sharing setting screen (not shown) that the UI control unit 305 of the management server 101 generates and the UI control unit 305 receives the user operation and registers it to the tenant management unit 304. For example, the user of a customer tenant selects via the sharing setting screen (not shown) the image forming apparatus 103 that belongs to their tenant and sets by designating the sales tenant with whom they wish to share. Note that regarding the sharing setting, it is only necessary that association is possible between a sharing origin and a sharing destination; accordingly, configuration may be taken such that a sharing request is outputted from a sales tenant and is approved on a customer tenant side.

An example of a tenant management table that the tenant management unit 304 manages is indicated in Table 5B.

TABLE 5B

| Tenant ID | Type of Tenant | Parent ID | Direct/Indirect Setting | Sharing | Service |
|---|---|---|---|---|---|
| T001 | Sales | | Direct | | ServBackup, ServA, ServB |
| T002 | Customer | T001 | (Direct) | | ServBackup, ServA |
| T003 | Sales | T001 | Indirect | | ServBackup, ServB |
| T004 | Customer | T003 | (Indirect) | T006 | ServBackup |
| T005 | Customer | T003 | (Indirect) | | ServBackup, ServA, |
| T006 | Sales | | Direct | | ServBackup, ServA, ServB |

Table 5B indicates a tenant management table that the tenant management unit 304 of the management server 101 manages, and tenant IDs, types of tenant, parent tenant IDs, direct/indirect settings, sharing, and services are managed. Note that what is the same as Table 5A will be omitted in the description of each of the columns in Table 5B.

The sharing (sharing information) is a column that indicates whether a setting that enables a tenant managed in a tenant information management table to reference in relation to any sales tenant has been made. For example, in a case of the tenant ID T004, it is indicated that referencing is enabled in relation to a tenant that corresponds to the tenant ID T006. The sharing setting is performed on a sharing setting screen (not shown) that the UI control unit 305 of the management server 101 generates and the UI control unit 305 receives the user operation and registers it to the tenant management unit 304. For example, the user of a customer tenant sets by designating the sales tenant with whom they wish to share from their tenant via the sharing setting screen (not shown). Note that regarding the sharing setting, it is only necessary that association is possible between a sharing origin and a sharing destination; accordingly, configuration may be taken such that a sharing request is outputted from a sales tenant and is approved on a customer tenant side.

Figure 4B:
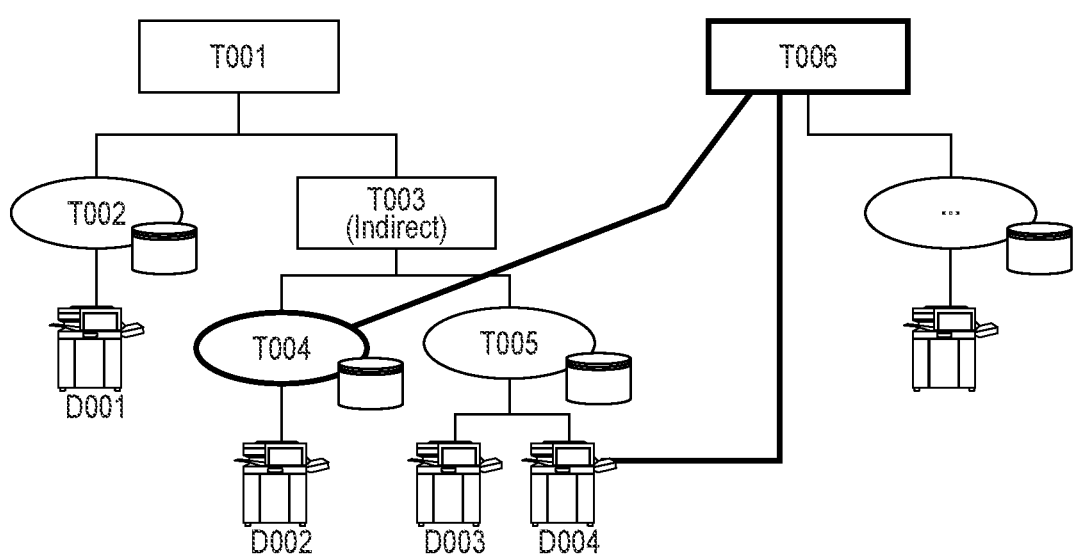

A multi-tenant structure to which a sharing state of backup data between predetermined groups of Table 4B and Table 5B have been added is illustrated in FIG. 4B.

The sharing state (i.e., a state in which referencing is possible) has been added in relation to FIG. 4A using a bold line between T006 and D004 (defined in Table 4B) and T006 and T004 (defined in Table 5B). T004 and T006 are unrelated tenants in a case of FIG. 4A but are in a state in which referencing is possible in FIG. 4B; accordingly, it is possible for an operation user of T006 to reference information (including backup data) of all image forming apparatuses that are associated with T004. Also, D004 and T006 are unrelated in a case of FIG. 4A and information of the image forming apparatus including backup data cannot be acquired. However, a state in which referencing is possible is entered to in FIG. 4B; accordingly, the operation user of T006 can reference information (including backup data) of the image forming apparatus associated with D004. Note that D003 associated with the same customer tenant as D004 is not in a state in which referencing is possible; accordingly, the operation user of T006 cannot acquire information of D003.

<Flow for Confirming Relationship>

Figure 11:
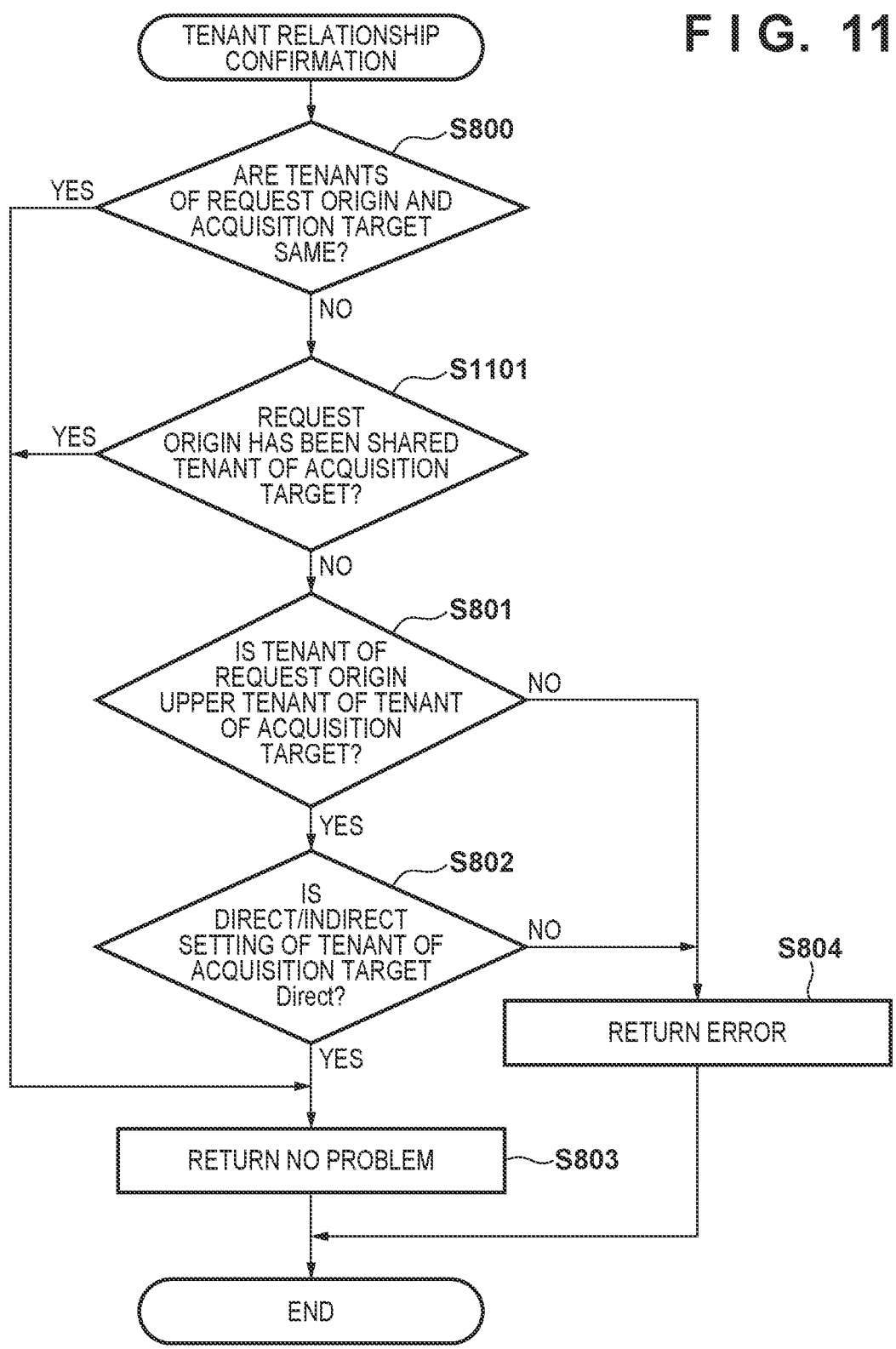
FIG. 11 is a view illustrating a processing flow for confirming a tenant relationship according to the embodiment.

Next, a processing procedure for confirming the relationship of a tenant of request origin and a tenant to which a target image forming apparatus belongs in the present embodiment will be described with reference to FIG. 11. The processing described below is realized by, for example, the CPU 211 of the management server 101 reading out to the RAM 212 and executing a control program stored in the storage apparatus 214 such as the ROM or the HDD. Note that steps S800 to S804 are the same as the processing described using FIG. 8; accordingly, description will be omitted. A point of difference is that determination in step S1101 has been added after the determination in step S800.

In step S1101, the backup data management unit 301 determines whether or not the tenant of request origin has been shared the tenant of the image forming apparatus to be the acquisition target. In other words, it is determined here whether or not the tenant of request origin can reference information of the tenant of the image forming apparatus to be the acquisition target. In a case where it is determined that referencing is possible, the processing transitions to step S803, and in a case where it is determined that referencing is not possible, the processing transitions to step S801.

As described above, by virtue of the present embodiment, backup data can be provided even in a case where referencing is not possible due to the relationship of tenants by enabling to add an authority that makes referencing possible in relation to a specific customer tenant or image forming apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-100275, filed Jun. 9, 2020, which is hereby incorporated by reference herein in its entirety.

What is claimed is:

1. An information processing apparatus comprising:
at least one memory device that stores a set of instructions; and
at least one processor that executes the set of instructions to:
manage backup data acquired from a first apparatus, wherein the managed backup data can be used for generating installation data;
receive a request from a request origin;
in a case where the received request is a first request for acquiring the managed backup data, generate, by using the managed backup data, installation data to be provided based on information associated with the request origin and information associated with the first apparatus, wherein the installation data is generated by deleting, as necessary, information to be concealed in the managed backup data; and
provide the generated installation data to the request origin,
wherein the at least one processor further executes instructions in the memory device to:
regularly accept backup data from a plurality of apparatuses;
manage the accepted backup data in association with identification information of an apparatus of an acquisition origin and identification information of a group to which the acquisition origin belongs; and
manage the identification information of the group in association with a type of group, identification information of a parent group, and information as to whether or not reference is possible that indicates whether or not backup data of a predetermined group can be referenced from a parent group.

2. The information processing apparatus according to claim 1,
wherein the at least one processor executes instructions in the memory device to:
in a case where the received request is a second request for acquiring a list of the managed backup data, notify, to the request origin, a list of backup data that can be selected based on the relationship of the information associated with the request origin and the information associated with the first apparatus, wherein the first request for acquiring the managed backup data includes identification information of backup data selected from the list of backup data.

3. The information processing apparatus according to claim 1,
wherein the at least one processor executes instructions in the memory device to:
as the relationship of the information associated with the request origin and the information associated with the acquisition origin, determine whether or not the request origin can reference backup data of the acquisition origin in accordance with identification information of a group to which the request origin belongs and the identification information of a group to which the acquisition origin belongs.

4. The information processing apparatus according to claim 3,
wherein the at least one processor executes instructions in the memory device to:
in a case where it is determined that the request origin cannot reference the backup data of the acquisition origin, notify an error without providing the request origin with the installation data.

5. The information processing apparatus according to claim 3,
wherein the at least one processor executes instructions in the memory device to:
further manage sharing information that enables provision of backup data between predetermined groups; and
in a case where the identification information of a group to which the request origin belongs and the identification information of a group to which the acquisition origin belongs are associated with the sharing information, determine that the request origin can reference backup data of the acquisition origin.

6. The information processing apparatus according to claim 1,
wherein the at least one processor executes instructions in the memory device to:
manage first confidential information that indicates, from data included in backup data, information that should be concealed; and
in a case where the first confidential information is included in the generated installation data, delete target data from that installation data.

7. The information processing apparatus according to claim 6,
wherein the at least one processor executes instructions in the memory device to:
further manage second confidential information of each customer in addition to the first confidential information; and
in a case where any of the first confidential information and the second confidential information of each customer that corresponds to the identification information of a group to which the acquisition origin belongs is included in the generated installation data, delete target data from that installation data.

8. The information processing apparatus according to claim 1,
wherein the at least one processor executes instructions in the memory device to:
in a case where identification information of a group to which the request origin belongs and the identification information of a group to which an acquisition origin belongs are the same, not perform deletion from the installation data.

9. The information processing apparatus according to claim 1,
wherein the at least one processor executes instructions in the memory device to:
provide a user interface for requesting desired installation data.

10. The information processing apparatus according to claim 9,
wherein the at least one processor executes instructions in the memory device to:
perform an authentication of a request origin via the user interface.

11. The information processing apparatus according to claim 9,
wherein the at least one processor executes instructions in the memory device to:
provide via the user interface a screen for setting identification information that indicates an apparatus that is to use the installation data.

12. The information processing apparatus according to claim 9,
wherein the at least one processor executes instructions in the memory device to:
provide via the user interface a screen for designating an apparatus of the acquisition origin.

13. The information processing apparatus according to claim 9,
wherein the at least one processor executes instructions in the memory device to:
provide via the user interface a backup data list screen.

14. The information processing apparatus according to claim 9,
wherein the at least one processor executes instructions in the memory device to:
provide via the user interface an error screen for notifying that backup data cannot be used with designated content.

15. A method for controlling an information processing apparatus, the method comprising:
managing backup data acquired from a first apparatus, wherein the managed backup data that can be used for generating installation data;
receiving a request from a request origin;
in a case where the received request is a first request for acquiring the managed backup data, using the managed backup data to generate the installation data to be provided based on information associated with the request origin and information associated with the first apparatus, wherein the installation data is generated by deleting, as necessary, information to be concealed in the managed backup data; and;
providing the generated installation data to the request origin, wherein the method further comprises
regularly accepting backup data from a plurality of apparatuses;
managing the accepted backup data in association with identification information of an apparatus of an acquisition origin and identification information of a group to which the acquisition origin belongs; and
managing the identification information of the group in association with a type of group, identification information of a parent group, and information as to whether or not reference is possible that indicates whether or not backup data of a predetermined group can be referenced from a parent group.

16. A non-transitory storage medium operable to store a program for causing a computer to execute each step of a method for controlling an information processing apparatus, the method comprising:
   managing backup data acquired from a first apparatus, wherein the managed backup data can be used for generating installation data;
   receiving a request from a request origin;
   in a case where the received request is a first request for acquiring the managed backup data, using the managed backup data to generate the installation data to be provided based on information associated with the request origin and information associated with the first apparatus, wherein the installation data is generated by deleting, as necessary, information to be concealed in the managed backup data; and
   providing the generated installation data to the request origin,
wherein the method further comprises
regularly accepting backup data from a plurality of apparatuses;
managing the accepted backup data in association with identification information of an apparatus of an acquisition origin and identification information of a group to which the acquisition origin belongs; and
managing the identification information of the group in association with a type of group, identification information of a parent group, and information as to whether or not reference is possible that indicates whether or not backup data of a predetermined group can be referenced from a parent group.

* * * * *